(12) United States Patent
Tokuda et al.

(10) Patent No.: US 7,263,972 B2
(45) Date of Patent: Sep. 4, 2007

(54) FUEL SUPPLY SYSTEM FOR INTERNAL COMBUSTION ENGINE

(75) Inventors: Kazuyuki Tokuda, Toyota (JP); Naoki Kurata, Nishikamo-gun (JP); Katsuhiko Yamaguchi, Nisshin (JP); Toshio Inoue, Gotenba (JP); Naoto Suzuki, Fujinomiya (JP); Mamoru Tomatsuri, Toyota (JP); Keiko Hasegawa, Toyota (JP); Keita Fukui, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 37 days.

(21) Appl. No.: 11/166,281

(22) Filed: Jun. 27, 2005

(65) Prior Publication Data

US 2006/0000452 A1 Jan. 5, 2006

(30) Foreign Application Priority Data

| Jul. 2, 2004 | (JP) | ............................. 2004-197351 |
| Nov. 19, 2004 | (JP) | ............................. 2004-336114 |
| Dec. 15, 2004 | (JP) | ............................. 2004-362838 |

(51) Int. Cl.
  *F02B 7/00* (2006.01)
  *F02B 7/02* (2006.01)
(52) U.S. Cl. ...................... 123/431; 123/456
(58) Field of Classification Search ................ 123/431, 123/456, 458, 506, 511, 514, 480
  See application file for complete search history.

(56) References Cited

U.S. PATENT DOCUMENTS

| 5,207,203 A | 5/1993 | Wagner et al. |
| 6,397,819 B1 | 6/2002 | Rembold et al. |
| 2003/0041838 A1 | 3/2003 | Tsuchiya |
| 2005/0193982 A1* | 9/2005 | Sakai et al. .................. 123/431 |
| 2005/0268889 A1* | 12/2005 | Kojima et al. .............. 123/458 |
| 2006/0207567 A1* | 9/2006 | Yamaguchi et al. ........ 123/431 |

FOREIGN PATENT DOCUMENTS

| EP | 1 188 919 A2 | 3/2002 |
| FR | 2 669 377 A1 | 5/1992 |
| JP | A 07-103048 | 4/1995 |
| JP | A 11-287148 | 10/1999 |
| JP | A 2000-274329 | 10/2000 |
| JP | A 2001-065421 | 3/2001 |
| JP | A 2003-074441 | 3/2003 |
| JP | A 2004-060474 | 2/2004 |
| JP | A 2004-278347 | 10/2004 |

* cited by examiner

*Primary Examiner*—Mahmoud Gimie
(74) *Attorney, Agent, or Firm*—Oliff & Berridge, PLC

(57) ABSTRACT

A low-pressure delivery pipe provided with intake manifold injectors, a fuel pressure regulator, a high-pressure fuel pump, a high-pressure delivery pipe provided with in-cylinder injectors, and an electromagnetic relief valve are connected in series at the downstream of a low-pressure fuel pump that discharges a fuel within a fuel tank at a prescribed pressure. Since the low-pressure delivery pipe is arranged downstream of the low-pressure fuel pump, the fuel pressure within the low-pressure delivery pipe is lowered upon stop of vehicle operation, in response to stop of the low-pressure fuel pump. The fuel pressure within the high-pressure delivery pipe is also lowered in response to stop of the low-pressure fuel pump, by opening the electromagnetic relief valve upon stop of vehicle operation. Thus, oil tightness of the injectors during the stop of vehicle operation is ensured.

14 Claims, 14 Drawing Sheets

FUEL SUPPLY SYSTEM FOR INTERNAL COMBUSTION ENGINE

This nonprovisional application is based on Japanese Patent Applications Nos. 2004-197351, 2004-336114 and 2004-362838 filed with the Japan Patent Office on Jul. 2, 2004, Nov. 19, 2004 and Dec. 15, 2004, respectively, the entire contents of which are hereby incorporated by reference.

BACKGROUND OF THE INVENTION

1. Field of the Invention

The present invention relates to a fuel supply system for an internal combustion engine, and more particularly to a fuel supply system for an internal combustion engine having first fuel injection means (intake manifold injector) for injecting a fuel into an intake manifold and/or an intake port, and second fuel injection means (in-cylinder injector) for injecting a fuel into a cylinder.

2. Description of the Background Art

An internal combustion engine provided with an in-cylinder injector (fuel injection valve) for injecting a fuel into a cylinder and an intake manifold injector (fuel injection valve) for injecting a fuel into an intake port, and controlling the in-cylinder injector and the intake manifold injector in accordance with an operation state to inject the fuel by combination of intake manifold injection and in-cylinder direct injection is known (e.g., Japanese Patent Laying-Open No. 07-103048).

In a fuel supply system for the internal combustion engine, generally, one fuel line extending from a fuel tank toward the internal combustion engine is branched in the vicinity of the internal combustion engine so as to supply the fuel to an intake manifold injector and to an in-cylinder injector. With this configuration, however, the fuel line has a complicated configuration in the vicinity of the internal combustion engine, and the fuel supplied from the fuel tank may be subjected to a great amount of heat from the engine block of the internal combustion engine. In general, the fuel supplied to the intake manifold injector is a fuel of a low pressure that is pumped up by using a low-pressure fuel pump. As such, it has been pointed out that the fuel, when subjected to the great amount of heat from the engine block, may partially vaporize in the fuel line or a delivery pipe for supplying the fuel into the intake manifold injector, leading to occurrence of vapor lock.

To address such a problem, for example, Japanese Patent Laying-Open No. 2004-278347 discloses a fuel supply system in which a fuel tank, a low-pressure fuel pump, a fuel pressure regulator (pressure regulator), an intake manifold injection (low-pressure) delivery pipe, a high-pressure fuel pump, an in-cylinder injection (high-pressure) delivery pipe, and a relief valve are arranged in series. In this fuel supply system, it is possible to prevent fuel injection failure attributable to the vapor lock caused in the pipe connected to the intake manifold injector with a simple configuration.

In the fuel supply system for an internal combustion engine as described above, it is also necessary to take account of various kinds of problems, besides the occurrence of the vapor lock, in association with the fuel supply to a plurality of systems.

Firstly, it is necessary to achieve a configuration that can improve oil tightness of the injectors during stop of operation of the vehicle, so as to maintain good exhaust property at the time of next start of the engine.

In the fuel supply system disclosed in Japanese Patent Laying-Open No. 2004-278347, for example, the intake manifold injection (low-pressure) delivery pipe is arranged downstream of the fuel pressure regulator. Thus, even if an electromagnetic relief valve for releasing pressure is arranged downstream of the in-cylinder injection (high-pressure) delivery pipe, it is difficult to intentionally release the fuel pressure of the low-pressure delivery pipe at the time of stop of operation of the vehicle. This leads to poor oil tightness, and there may occur leakage of the fuel from the intake manifold injector during stop of operation. Such leakage of the fuel may lead to degradation in exhaust emission property at the time of next start of the engine.

Further, it is necessary to achieve a configuration that enables preferable fuel injection in accordance with a temperature of the engine.

For example, in a cold state of the engine, atomization of the fuel within the cylinder would not be promoted, so that the fuel injected into the cylinder tends to adhere to the top face of the engine piston (piston top face) or to the inner peripheral surface of the cylinder (cylinder inner face (bore)) in a large amount. Of the fuel thus adhered, especially the fuel adhered to the piston top face will be gradually atomized during the subsequent engine combustion process, and discharged from the cylinder in the state of imperfect combustion. This will cause generation of black smoke, increase of unburned components and the like, leading to degradation of exhaust emission property. Further, the fuel adhered to the cylinder inner face will be mixed with the lubricant applied to the cylinder inner face for lubrication of the engine piston. This will cause dilution of the lubricant by the fuel, i.e., so-called fuel dilution, so that the lubrication property of the internal combustion engine may be impaired.

Thus, taking account of the adverse effects of degraded exhaust emission property as well as lowered lubrication property of the internal combustion engine, it is preferable to inject the fuel from the intake manifold injector at the time of homogenous combustion operation in the cold state of the engine, while avoiding the fuel injection from the in-cylinder injector.

In the fuel supply system disclosed in Japanese Patent Laying-Open No. 2004-278347, however, the intake manifold injection delivery pipe and the in-cylinder injection delivery pipe are connected in series, with the intake manifold injection delivery pipe located upstream of the in-cylinder injection delivery pipe. As such, in the cold state of the engine, the temperature increase of the fuel within the in-cylinder injection delivery pipe is slow, and the atomized particle size of the fuel injected from the intake manifold injector tends to become large, leading to degradation of exhaust emission property.

Meanwhile, when the operation of the internal combustion engine proceeds (i.e., in the warm state of the engine), the temperature at the tip end of the in-cylinder injector increases with the fuel combustion within the combustion chamber, and deposits tend to be produced in the injection hole at the tip of the in-cylinder injector, which cools the in-cylinder injector. Therefore, it is preferable that the fuel temperature within the in-cylinder injection delivery pipe is low.

With the configuration disclosed in Japanese Patent Laying-Open No. 2004-278347, however, the in-cylinder injection delivery pipe is arranged downstream. Thus, only the fuel of the quantity corresponding to the overall fuel quantity supplied from the fuel pump from which the fuel quantity injected from the intake manifold injector is subtracted, is applied with pressure by using the high-pressure fuel pump and provided to the in-cylinder injection delivery pipe. That is, since the fuel flow rate within the in-cylinder injection delivery pipe is small, the fuel temperature within the in-cylinder injection delivery pipe tends to increase due to the heat received from the internal combustion engine. As such, the effect of cooling the in-cylinder injector is not obtained sufficiently, which is disadvantageous in view of accumulation of deposits.

Still further, since there exist a plurality of fuel systems (of high pressure and of low pressure), it is also necessary to achieve a configuration that can prevent vapor lock within the fuel supply system attributable to the difference in fuel injection quantity between the fuel systems.

SUMMARY OF THE INVENTION

The present invention has been made to solve the above-described problems. A first object of the present invention is to provide a fuel supply system for an internal combustion engine provided with a first fuel injection unit (intake manifold injector) for injecting a fuel into an intake manifold and/or an intake port and a second fuel injection unit (in-cylinder injector) for injecting a fuel into a cylinder, that can improve oil tightness of the injectors during stop of operation of the vehicle and that can maintain good exhaust emission property at the time of start of the engine.

A second object of the present invention is to provide a fuel supply system for an internal combustion engine provided with a first fuel injection unit (intake manifold injector) for injecting a fuel into an intake manifold and/or an intake port and a second fuel injection unit (in-cylinder injector) for injecting a fuel into a cylinder, that can improve exhaust emission property at the time of intake manifold injection in a cold state of the engine and that can suppress production of deposits at the tip end of the in-cylinder injector.

A third object of the present invention is to provide a fuel supply system for an internal combustion engine that can suppress generation of vapor lock attributable to insufficient fuel supply quantity to a high-pressure fuel pump.

A fuel supply system for an internal combustion engine according to the present invention includes a fuel tank, a first fuel pump, a first fuel delivery pipe, a second fuel pump, a second fuel delivery pipe, a pressure regulation unit, and a pressure release unit. The fuel tank stores a fuel. The first fuel pump is actuated in response to an operation instruction associated with an operation period of the internal combustion engine and discharges the fuel in the fuel tank at a first pressure. The first fuel delivery pipe is formed as a tubular body having a first fuel injection unit, receives the fuel discharged from the first fuel pump at an upstream side, and delivers the fuel to the first fuel injection unit such that the fuel is injected into the internal combustion engine. The second fuel pump is connected in series with the first fuel delivery pipe, is actuated during operation of the internal combustion engine, and applies pressure to the fuel received from a downstream side of the first fuel delivery pipe to discharge the fuel at a second pressure. The second fuel delivery pipe is formed as a tubular body having a second fuel injection means, receives the fuel discharged from the second fuel pump at an upstream side, and delivers the fuel to the second fuel injection unit such that the fuel is injected into the internal combustion engine. The pressure regulation unit is provided on a fuel path between the first fuel delivery pipe and the second fuel pump, and guides the fuel in the fuel path to a pressure release path when a pressure of the fuel in the fuel path exceeds the first pressure. The pressure release unit is provided between the fuel path downstream of the second fuel pump and the pressure release path, and is actuated at the stop of operation of a vehicle to guide the fuel in the fuel path to the pressure release path.

According to this fuel supply system for an internal combustion engine, in the configuration where the first and second fuel injection units are provided independently from each other, the first fuel delivery pipe (low-pressure delivery pipe) is arranged upstream of the pressure regulation unit (fuel pressure regulator). Thus, at the end of operation of the vehicle (i.e., at the stop of operation of the internal combustion engine), the fuel pressure in the first fuel delivery pipe can be lowered in response to stop of the first fuel pump (low-pressure fuel pump), and the fuel pressure in the second fuel delivery pipe (high-pressure delivery pipe) can also be lowered by activating the pressure release unit. This can prevent degradation in oil tightness of the first fuel injection unit (intake manifold injector) and the second fuel injection unit (in-cylinder injector) during the time period where the operation is stopped until the next start of operation, and thus, leakage of the fuel from the fuel injection units, and hence, degradation in exhaust property at the next start of the internal combustion engine can be prevented. Further, since the fuel discharged from the first fuel pump is guided through the first fuel delivery pipe, the pressure regulation unit, the second fuel pump (high-pressure pump) and the second fuel delivery pipe connected in series, fuel injection failure attributable to vapor lock generated in the pipe of the low-pressure system is avoided with a simple configuration.

A fuel supply system for an internal combustion engine according to another configuration of the present invention includes a fuel tank, a first fuel pump, a first fuel delivery pipe, a pressure regulation unit, a second fuel pump, a second fuel delivery pipe, a first pressure release unit, and a second pressure release unit. The fuel tank stores a fuel. The first fuel pump is actuated in response to an operation instruction associated with an operation period of the internal combustion engine, and discharges the fuel in the fuel tank at a first pressure. The first fuel delivery pipe is formed as a tubular body having a first fuel injection unit, receives the fuel discharged from the first fuel pump at an upstream side, and delivers the fuel to the first fuel injection unit such that the fuel is injected into the internal combustion engine. The pressure regulation unit is provided on a fuel path between the first fuel pump and an upstream side of the first fuel delivery pipe, and guides the fuel in the fuel path to a pressure release path when a pressure of the fuel in the fuel path exceeds the first pressure. The second fuel pump is actuated during operation of the internal combustion engine, receives the fuel output from the first fuel pump, and further applies pressure to the fuel to discharge the fuel at a second pressure. The second fuel delivery pipe is formed as a tubular body having a second fuel injection unit, receives the fuel discharged from the second fuel pump, and delivers the fuel to the second fuel injection unit such that the fuel is injected into the internal combustion engine. The first pressure release unit is provided on a fuel path between the pressure regulation unit and the first fuel delivery pipe, and is activated at the stop of operation of a vehicle to guide the fuel in the fuel path to a pressure release path. The second pressure release unit is provided on a fuel path downstream of the second fuel pump, and is activated at the stop of the operation of the vehicle to guide the fuel in the fuel path to a pressure release path.

According to this fuel supply system for an internal combustion engine, in the configuration where the first and second fuel injection units are provided independently from each other, the first and second pressure release units are activated at the end of operation of the vehicle (i.e., at the stop of operation of the internal combustion engine), and thus, the fuel pressures in the first fuel delivery pipe (low-pressure delivery pipe) and in the second fuel delivery pipe (high-pressure delivery pipe) can be lowered. This can prevent degradation in oil tightness of the first fuel injection unit (intake manifold injector) and the second fuel injection unit (in-cylinder injector) during the time period where the operation is stopped until the next start of operation, and thus, leakage of the fuel from the fuel injection units is prevented. Accordingly, degradation in exhaust emission property at the next start of the internal combustion engine can be prevented.

The first fuel pump is activated in response to an operation instruction associated with an operation period of the internal combustion engine. Thus, for example by generating the operation instruction in response to an operation start instruction of the internal combustion engine, it is possible to make the first fuel pump enter an operating state before the internal combustion engine actually starts operation.

Preferably, in the fuel supply system for an internal combustion engine according to the other configuration, the pressure regulation unit is integrally provided in the fuel tank.

According to this configuration, the pressure regulation unit can be arranged occupying only a small area.

Still preferably, the pressure release path is a fuel return pipe to the fuel tank.

Still preferably, in the fuel supply system for an internal combustion engine of the present invention, the first fuel injection unit (intake manifold injector) injects the fuel into an intake manifold of the internal combustion engine, and the second fuel injection unit (in-cylinder injector) injects the fuel into a combustion chamber of the internal combustion engine.

According to this fuel supply system for an internal combustion engine, where fuel injection into an intake manifold and fuel injection into a combustion chamber can be carried out independently from each other, degradation in oil tightness of the fuel injection units can be prevented as described above, and thus, degradation in exhaust property at the start of operation of the internal combustion engine can also be prevented.

A fuel supply system for an internal combustion engine according to yet another configuration of the present invention is provided with a first fuel injection unit for injecting a fuel into an intake manifold and a second fuel injection unit for injecting a fuel into a cylinder, and includes a first fuel delivery pipe, a fuel pump, and a second fuel delivery pipe. The first fuel delivery pipe delivers the fuel received at an upstream side to the first fuel injection unit such that the fuel is injected into the intake manifold. The fuel pump discharges a fuel in a fuel tank at a prescribed pressure. The second fuel delivery pipe receives the fuel discharged by the fuel pump at an upstream side and delivers the fuel to the second fuel injection unit such that the fuel is injected into the cylinder. The first and second fuel delivery pipes are connected in series, with the upstream side of the first fuel delivery pipe being connected to a downstream side of the second fuel delivery pipe.

According to this fuel supply system for an internal combustion engine, the first fuel delivery pipe for intake manifold injection and the second fuel delivery pipe for in-cylinder fuel injection are connected in series. This can simplify the system configuration, as the branched fuel paths are necessary. Further, it can be configured such that the fuel to be injected from the first fuel injection unit (intake manifold injector) is supplied to the first fuel delivery pipe (PFI delivery pipe) after being passed through the second fuel delivery pipe (DI delivery pipe).

Thus, compared to the configuration where the first fuel delivery pipe is arranged upstream, the temperature of the fuel injected from the first fuel injection unit in a cold state of the engine can be increased quickly. Accordingly, in the cold start of the engine where it is preferable to avoid fuel injection from the second fuel injection unit (in-cylinder injector), the atomized particle size of the fuel injected from the first fuel injection unit can be downsized, so that the degradation of exhaust emission property can be prevented.

Further, compared to the configuration where the first fuel delivery pipe is arranged upstream, the flow rate of the fuel in the second fuel delivery pipe is large, and thus, during the warm state of the engine, the temperature increase of the fuel within the second fuel delivery pipe along with the operation of the internal combustion engine is suppressed. As a result, the cooling effect of the second fuel injection unit by the fuel passing through the second fuel delivery pipe or by the fuel injected therefrom is ensured, and accordingly, the temperature increase of the second fuel injection unit conducting in-cylinder injection is suppressed, and production of deposits is prevented.

Preferably, in the fuel supply system for an internal combustion engine, the second fuel delivery pipe is arranged at a position receiving heat from the internal combustion engine.

According to this fuel supply system for an internal combustion engine, the fuel to be injected from the first and second fuel injection units is passed through the second fuel delivery pipe subjected to a great amount of heat. This further improves the exhaust property in the cold state of the engine, and also considerably improves the effect of preventing production of deposits in the second fuel injection unit along with the operation of the internal combustion engine.

Preferably, the fuel supply system for an internal combustion engine further includes a first fuel pressure regulation unit and a second fuel pressure regulation unit. The fuel pump discharges the fuel at a first prescribed pressure. The first fuel pressure regulation unit is arranged downstream of the second fuel delivery pipe and maintains a pressure of the fuel in the second fuel delivery pipe at the first prescribed pressure. The second fuel pressure regulation unit is arranged downstream of the first fuel delivery pipe and maintains a pressure of the fuel in the first fuel delivery pipe at a second prescribed pressure lower than the first prescribed pressure.

According to this fuel supply system for an internal combustion engine, the fuel injection pressure from the second fuel injection unit conducting direct in-cylinder injection is set at a high pressure required for atomization of the fuel, while the fuel injection pressure from the first fuel injection unit conducting intake manifold injection is set at a low pressure. Accordingly, the designed withstand pressure of the first fuel injection unit and the first fuel delivery pipe not requiring fuel atomization with the high pressure can be lowered, which leads to reduction of the manufacturing cost.

More preferably, in the fuel supply system for an internal combustion engine, the first fuel pressure regulation unit is a relief valve that opens when a pressure larger than the first prescribed pressure is applied from the fuel and can open in response to an electric signal.

According to this fuel supply system for an internal combustion engine, the relief valve is opened at the stop of operation, for example, so as to form a pressure release path at the downstream side of the second fuel delivery pipe as well as at the upstream side of the first fuel delivery pipe. Thus, it is possible to sufficiently lower the fuel pressure within the first and second fuel delivery pipes during the stop of operation of the internal combustion engine, and oil tightness of the first and second fuel injection units is improved. As a result, it is possible to suppress degradation of exhaust emission property at the next start of the internal combustion engine.

Alternatively, the fuel supply system for an internal combustion engine further includes a fuel pressure regulation unit. The fuel pressure regulation unit is arranged downstream of the first fuel delivery pipe, and guides the fuel to a pressure release path when a prescribed pressure is applied from the fuel. The pressure of the fuel injected from the first fuel injection unit and the pressure of the fuel injected from the second fuel injection unit are substantially equal.

According to this fuel supply system for an internal combustion engine, the fuel injection pressure of the first fuel injection unit conducting intake manifold fuel injection and the fuel injection pressure of the second fuel injection unit conducting direct in-cylinder fuel injection are equal. Specifically, they are set to a high pressure required for atomization of the fuel injected into the cylinder. Since the fuel pressure within the fuel supply system becomes constant, the system configuration is simplified, and the atomized particle size of the fuel injected from the first fuel injection unit is further downsized. Accordingly, the exhaust emission property in the cold state of the engine is further improved.

Still preferably, in the fuel supply system for an internal combustion engine, the fuel pressure regulation unit is a relief valve that opens when the prescribed pressure is applied from the fuel and can open in response to an electric signal.

According to this fuel supply system for an internal combustion engine, the pressure release path is formed downstream of the first fuel delivery pipe by opening the relief valve at the stop of operation, for example. This can lower the fuel pressure within the first and second fuel delivery pipes. Accordingly, oil tightness in the first and second fuel injection units during the stop of operation of the internal combustion engine is improved, and degradation in exhaust emission property at the next start of operation of the internal combustion engine is prevented.

A fuel supply system for an internal combustion engine according to yet another configuration of the present invention has an in-cylinder injector provided at an in-cylinder injection fuel delivery pipe and for injecting a fuel into a combustion chamber and an intake manifold injector provided at an intake manifold injection fuel delivery pipe and for injecting a fuel into an intake manifold, and applies pressure to a fuel discharged from a low-pressure fuel pump by using a high-pressure fuel pump to supply the fuel to the in-cylinder injection fuel delivery pipe. The fuel supply system includes a connection fuel pipe connecting a downstream side of the high-pressure fuel pump to an upstream side of the intake manifold injection fuel delivery pipe, and an intake manifold injection pressure regulation unit for adjusting a pressure of the fuel within the intake manifold injection fuel delivery pipe.

According to this fuel supply system for an internal combustion engine, all of the fuel discharged from the low-pressure fuel pump is supplied to the high-pressure fuel pump. This advantageously prevents generation of vapor lock attributable to insufficient fuel supply from the low-pressure fuel pump to the high-pressure fuel pump.

Generally, in the case where the downstream side of the high-pressure fuel pump is connected to the upstream side of the intake manifold injection fuel delivery pipe and pressure regulation is not performed for the fuel within the intake manifold injection fuel delivery pipe, the fuel of the high pressure discharged from the high-pressure fuel pump is flown into the intake manifold injection fuel delivery pipe, making it difficult to accurately conduct the fuel injection from the intake manifold injector.

By comparison, according to the above fuel supply system for an internal combustion engine, the intake injection pressure regulation unit regulates the pressure of the fuel within the intake manifold injection fuel delivery pipe, and accordingly, the fuel injection from the intake manifold injector can be carried out with accuracy.

Alternatively, a fuel supply system for an internal combustion engine according to yet another configuration of the present invention includes: an in-cylinder injector for injecting a fuel into a combustion chamber; an in-cylinder injection fuel delivery pipe provided with the in-cylinder injector; a low-pressure fuel pump for pumping up a fuel from a fuel tank; a fuel supply pipe for connecting a discharge port of the low-pressure fuel pump to an upstream side of the in-cylinder injection fuel delivery pipe; a high-pressure fuel pump for applying pressure to the fuel discharged from the low-pressure fuel pump and supplying the fuel to the in-cylinder injection fuel delivery pipe; an in-cylinder injection pressure regulation valve provided at the fuel supply pipe downstream of the high-pressure fuel pump and for regulating a pressure of the fuel within the in-cylinder injection fuel delivery pipe not to exceed an in-cylinder injection pressure; an intake manifold injector for injecting a fuel into an intake manifold; an intake manifold injection fuel delivery pipe provided with the intake manifold injector; a connection fuel pipe for connecting an outlet port of the in-cylinder injection pressure regulation valve to an upstream side of the intake manifold injection fuel delivery pipe; a fuel return pipe for connecting a downstream side of the intake manifold injection fuel delivery pipe to the fuel tank; and an intake manifold injection pressure regulation valve provided at the fuel return pipe and for regulating a pressure of the fuel within the intake manifold injection fuel delivery pipe not to exceed an intake manifold injection pressure that is lower than the in-cylinder injection pressure.

With this configuration as well, the effects similar to those achieved by the above fuel supply system can be obtained.

Still alternatively, a fuel supply system for an internal combustion engine according to yet another configuration of the present invention includes: an in-cylinder injector for injecting a fuel into a combustion chamber; an in-cylinder injection fuel delivery pipe provided with the in-cylinder injector; a low-pressure fuel pump for pumping up a fuel from a fuel tank; a fuel supply pipe for connecting a discharge port of the low-pressure fuel pump to an upstream side of the in-cylinder injection fuel delivery pipe; a high-pressure fuel pump for applying pressure to the fuel discharged from the low-pressure fuel pump and for supplying the fuel to the in-cylinder injection fuel delivery pipe; an intake manifold injector for injecting a fuel into an intake manifold; an intake manifold injection fuel delivery pipe provided with the intake manifold injector; a connection fuel pipe for connecting a downstream side of the in-cylinder injection fuel delivery pipe to an upstream side of the intake manifold injection fuel delivery pipe; an in-cylinder injection pressure regulation valve provided at the connection fuel pipe and for regulating a pressure of the fuel within the in-cylinder injection fuel delivery pipe not to exceed an in-cylinder injection pressure; a fuel return pipe for connecting a downstream side of the intake manifold injection fuel delivery pipe to the fuel tank; and an intake manifold injection pressure regulation valve provided at the fuel return pipe and for regulating a pressure of the fuel within the intake manifold injection fuel delivery pipe not to exceed an intake manifold injection pressure that is lower than the in-cylinder injection pressure.

With this configuration as well, the effects similar to those achieved by the above fuel supply system can be obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described in detail with reference to the drawings.

First Embodiment

Figure 1:
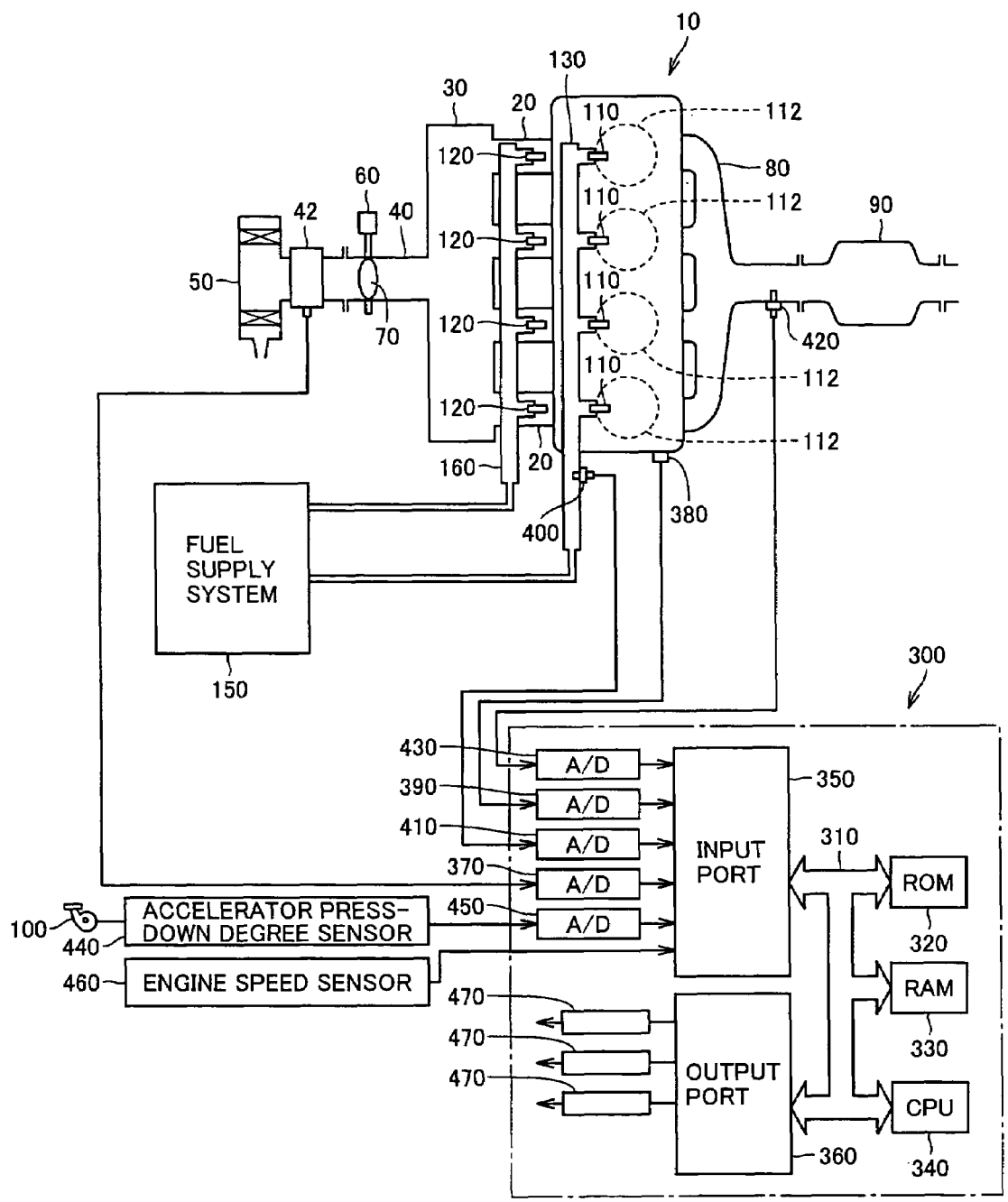
FIG. 1 is a schematic configuration diagram of an engine system to which a fuel supply system according to a first embodiment of the present invention is applied.

FIG. 1 schematically shows an engine system incorporating a fuel supply system for an internal combustion engine according to a first embodiment of the present invention. Although an in-line 4-cylinder gasoline engine is shown in FIG. 1, application of the present invention is not restricted to the engine shown.

As shown in FIG. 1, the engine (internal combustion engine) 10 includes four cylinders 112, which are connected via corresponding intake manifolds 20 to a common surge tank 30. Surge tank 30 is connected via an intake duct 40 to an air cleaner 50. In intake duct 40, an airflow meter 42 and a throttle valve 70, which is driven by an electric motor 60, are disposed. Throttle valve 70 has its degree of opening controlled based on an output signal of an engine ECU (Electronic Control Unit) 300, independently from an accelerator pedal 100. Cylinders 112 are connected to a common exhaust manifold 80, which is in turn connected to a three-way catalytic converter 90.

For each cylinder 112, an in-cylinder injector 110 for injecting a fuel into the cylinder and an intake manifold injector 120 for injecting a fuel into an intake port and/or an intake manifold are provided.

Injectors 110, 120 are controlled based on output signals of engine ECU 300. In-cylinder injectors 110 are connected to a common fuel delivery pipe (also referred to as "high-pressure delivery pipe" in the first embodiment) 130, and intake manifold injectors 120 are connected to a common fuel delivery pipe (also referred to as "low-pressure delivery pipe" in the first embodiment) 160. Fuel supply to fuel delivery pipes 130, 160 is carried out by a fuel supply system 150, which will be described later in detail.

Engine ECU 300 is configured with a digital computer, which includes a ROM (Read Only Memory) 320, a RAM (Random Access Memory) 330, a CPU (Central Processing Unit) 340, an input port 350, and an output port 360, which are connected to each other via a bidirectional bus 310.

Airflow meter 42 generates an output voltage that is proportional to an intake air amount, and the output voltage of airflow meter 42 is input via an A/D converter 370 to input port 350. A coolant temperature sensor 380 is attached to engine 10, which generates an output voltage proportional to an engine coolant temperature. The output voltage of coolant temperature sensor 380 is input via an A/D converter 390 to input port 350.

A fuel pressure sensor 400 is attached to high-pressure delivery pipe 130, which generates an output voltage proportional to a fuel pressure in high-pressure delivery pipe 130. The output voltage of fuel pressure sensor 400 is input via an A/D converter 410 to input port 350. An air-fuel ratio sensor 420 is attached to exhaust manifold 80 located upstream of three-way catalytic converter 90. Air-fuel ratio sensor 420 generates an output voltage proportional to an oxygen concentration in the exhaust gas, and the output voltage of air-fuel ratio sensor 420 is input via an A/D converter 430 to input port 350.

Air-fuel ratio sensor 420 in the engine system of the present embodiment is a full-range air-fuel ratio sensor (linear air-fuel ratio sensor) that generates an output voltage proportional to an air-fuel ratio of the air-fuel mixture burned in engine 10. As air-fuel ratio sensor 420, an O₂ sensor may be used which detects, in an on/off manner, whether the air-fuel ratio of the mixture burned in engine 10 is rich or lean with respect to a theoretical air-fuel ratio.

Accelerator pedal 100 is connected to an accelerator press-down degree sensor 440 that generates an output voltage proportional to the degree of press-down of accelerator pedal 100. The output voltage of accelerator press-down degree sensor 440 is input via an A/D converter 450 to input port 350. An engine speed sensor 460 generating an output pulse representing the engine speed is connected to input port 350. ROM 320 of engine ECU 300 prestores, in the form of a map, values of fuel injection quantity that are set corresponding to operation states based on the engine load factor and the engine speed obtained by the above-described accelerator press-down degree sensor 440 and engine speed sensor 460, respectively, and the correction values based on the engine coolant temperature.

Engine ECU 300 generates various control signals for controlling the overall operations of the engine system based on signals from the respective sensors by executing a prescribed program. The control signals are transmitted to the devices and circuits constituting the engine system via an output port 360 and drive circuits 470.

Figure 2:
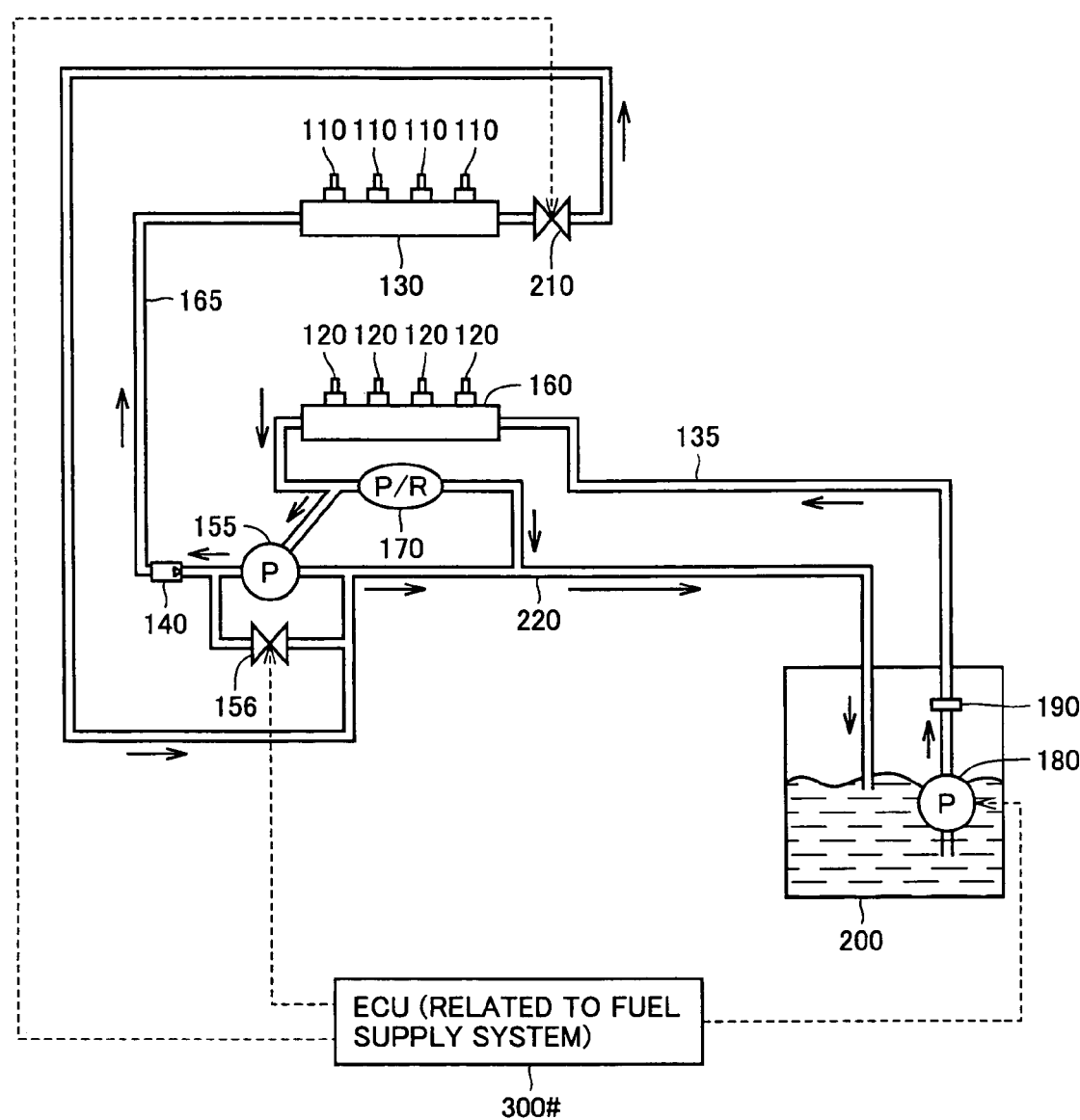
FIG. 2 illustrates in detail a configuration of the fuel supply system of FIG. 1.

FIG. 2 illustrates in detail the configuration of fuel supply system 150 shown in FIG. 1.

In FIG. 2, the portions other than in-cylinder injectors 110, high-pressure delivery pipe 130, intake manifold injectors 120 and low-pressure delivery pipe 160 correspond to the fuel supply system 150 of FIG. 1.

The fuel stored in a fuel tank 200 is discharged at a prescribed pressure by a low-pressure fuel pump 180 of an electric motor-driven type. Low-pressure fuel pump 180 is controlled based on a control signal from an ECU 300#. Here, ECU 300# corresponds to a functional part of engine ECU 300 of FIG. 1 that is related to control of the fuel supply system.

The discharge side of low-pressure fuel pump 180 is connected via a fuel filter 190 and a fuel pipe 135 to a low-pressure delivery pipe 160 that is formed as a tubular body provided with intake manifold injectors 120. That is, low-pressure delivery pipe 160 receives the fuel discharged from low-pressure fuel pump 180 via fuel pipe 135 on the upstream side, and delivers the fuel to intake manifold injectors 120 so as to be injected into the internal combustion engine. It is noted that in the application of the present invention, an arbitrary number of (i.e., one or more) intake manifold injectors 120 may be provided to low-pressure delivery pipe 160.

The downstream side of low-pressure delivery pipe 160 is connected to the intake side of a high-pressure fuel pump 155 of an engine-driven type. Fuel pressure regulator 170 is configured to guide the fuel on the downstream side of low-pressure delivery pipe 160 to a fuel return pipe 220 when a pressure (fuel pressure) of the fuel becomes higher than a preset pressure. As such, the fuel pressure on the downstream side of fuel pressure regulator 170 is maintained so as not to exceed the preset pressure.

The discharge side of high-pressure fuel pump 155 is connected to a fuel pipe 165 via a check valve 140 that allows the flow toward the fuel pipe 165. Fuel pipe 165 is connected to a high-pressure delivery pipe 130 that is formed as a tubular body provided with in-cylinder injectors 110. It is also noted that an arbitrary number of (i.e., one or more) in-cylinder injectors 110 may be provided to high-pressure delivery pipe 130.

The discharge side of high-pressure fuel pump 155 is also connected to the intake side of high-pressure fuel pump 155 via an electromagnetic spill valve 156. As the degree of opening of electromagnetic spill valve 156 decreases, the quantity of the fuel supplied from high-pressure fuel pump 155 to fuel pipe 165 increases. When electromagnetic spill valve 156 is fully open, fuel supply from high-pressure pump 155 to fuel pipe 165 is stopped. Electromagnetic spill valve 156 is controlled in response to an output signal of ECU 300#.

High-pressure delivery pipe 130 receives on its upstream side the fuel discharged from high-pressure fuel pump 155 via fuel pipe 165, and delivers the fuel to in-cylinder injectors 110 so as to be injected into the internal combustion engine. Further, an electromagnetic relief valve 210 is provided on the downstream side of high-pressure delivery pipe 130. Electromagnetic relief valve 210 is opened in response to a control signal from ECU 300#, and guides the fuel within high-pressure delivery pipe 130 to fuel return pipe 220.

As such, in the fuel supply system according to the present embodiment, low-pressure delivery pipe 160 and high-pressure delivery pipe 130 are arranged in series, as in Japanese Patent Laying-Open No. 2004-278347 described above, and then low-pressure delivery pipe 160 is arranged upstream of fuel pressure regulator 170.

In the fuel supply system shown in FIG. 2, low-pressure fuel pump 180 and low-pressure delivery pipe 160 correspond to the "first fuel pump" and the "first fuel delivery pipe", respectively, of the present invention. High-pressure fuel pump 155 and high-pressure delivery pipe 130 correspond to the "second fuel pump" and the "second fuel delivery pipe", respectively, of the present invention. Further, fuel pressure regulator 170 corresponds to the "pressure regulation unit", fuel return pipe 220 corresponds to the "pressure release path", and electromagnetic relief valve 210 corresponds to the "pressure release means" of the present invention.

Hereinafter, operation timings of the low-pressure fuel pump and the pressure release means (electromagnetic valve) in the fuel supply system according to the first embodiment of the present invention will be described with reference to FIG. 3.

Figure 3:
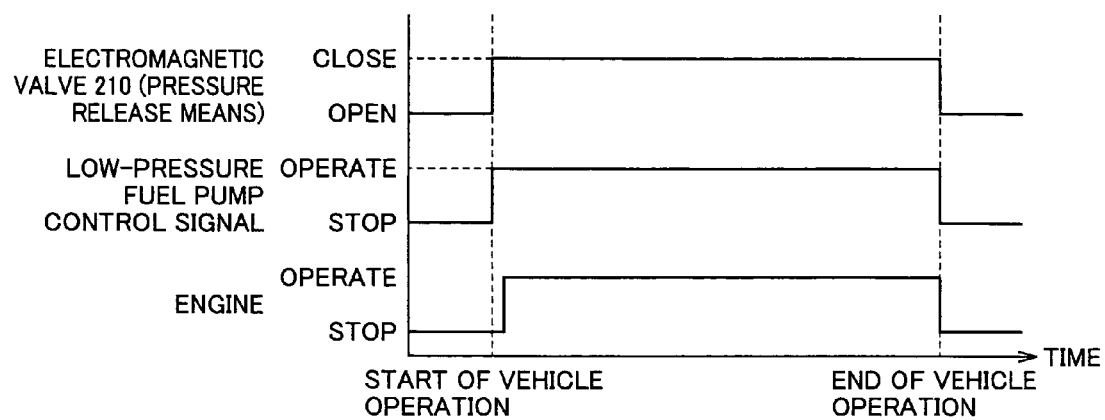
FIG. 3 is a timing diagram illustrating operation timings of a low-pressure fuel pump and pressure release means (electromagnetic relief valve) in the fuel supply system according to the first embodiment.

Referring to FIG. 3, operation of low-pressure fuel pump 180 is controlled in accordance with a control signal ("LOW-PRESSURE FUEL PUMP CONTROL SIGNAL" in FIG. 3) from engine ECU 300 that corresponds to the operation period of engine 10. As such, at the start of operation of the vehicle, electromagnetic relief valve 210 is switched from the open state to the closed state, and the operation of low-pressure fuel pump 180 is also started.

Further, in response to activation of the starter, engine 10 is activated to enter an operating state. That is, the operations of low-pressure fuel pump 180 and electromagnetic relief valve 210 are controlled using the start of operation as a trigger, so that it is ensured that the fuel pressure in the low-pressure system is increased by driving low-pressure fuel pump 180 and electromagnetic relief valve 210 is closed at the timing of start of engine 10.

High-pressure fuel pump 155 also starts operation in accordance with the start of engine 10, and fuel injection from the high-pressure system (in-cylinder injectors 110) becomes possible in addition to fuel injection from the low-pressure system (intake manifold injectors 120).

At the end of operation of the vehicle, the operation of low-pressure fuel pump 180 is stopped in response to stop of engine 10, and electromagnetic relief valve 210 is opened.

For example, the start and end of the operation correspond to on and off of the ignition switch.

Referring again to FIG. 2, as electromagnetic relief valve 210 is opened at the end of operation, the fuel pressure in high-pressure delivery pipe 130 is sufficiently lowered. Further, since low-pressure delivery pipe 160 is arranged upstream of fuel pressure regulator 170, the fuel pressure within low-pressure delivery pipe 160 can be lowered in response to stop of low-pressure fuel pump 180.

As such, during the time period in which operation is stopped until the next start of operation, oil tightness of high-pressure delivery pipe 130 and low-pressure delivery pipe 160 will not be degraded, and thus, the leakage of the fuel from in-cylinder injectors 110 and intake manifold injectors 120 is prevented. Accordingly, it is possible to prevent degradation in exhaust emission property at the time of engine start upon the next start of operation.

Further, in the fuel supply system shown in FIG. 2, as in the case of Japanese Patent Laying-Open No. 2004-278347, the fuel discharged from low-pressure fuel pump 180 is guided through low-pressure delivery pipe 160, fuel pressure regulator 170, high-pressure fuel pump 155 and high-pressure delivery pipe 130 connected in series. Thus, it is possible with a simple configuration to prevent fuel injection failure attributable to the vapor lock generated within the pipe of the low-pressure system connected to the intake manifold injectors.

Modification of First Embodiment

A configuration example of a fuel supply system for an internal combustion engine according to a modification of the first embodiment will now be explained.

Figure 4:
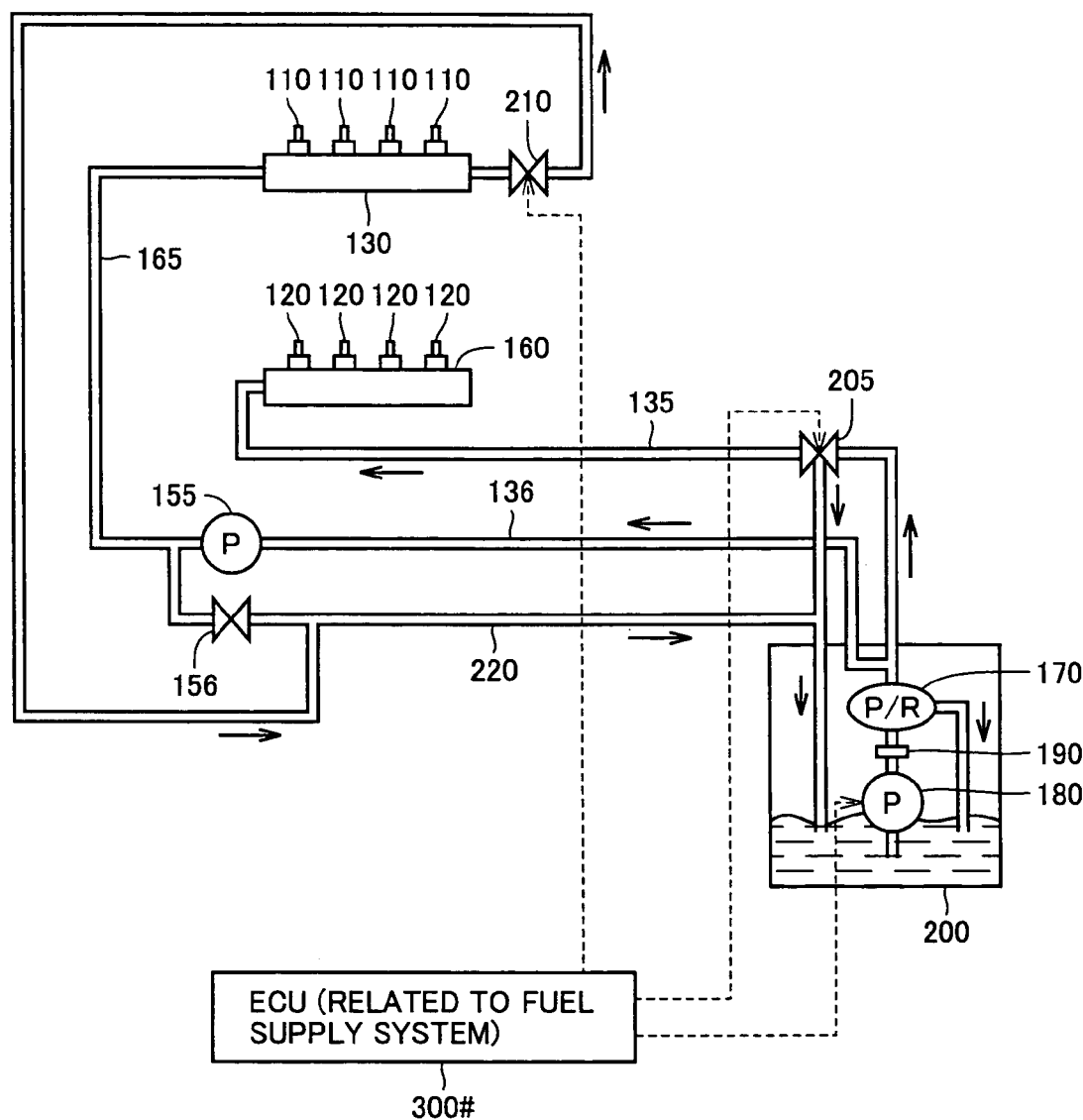
FIG. 4 illustrates a configuration example of a fuel supply system for an internal combustion engine according to a modification of the first embodiment.

Referring to FIG. 4, the fuel supply system according to the modification of the first embodiment differs from the configuration example shown in FIG. 2 in that the fuel discharged from low-pressure fuel pump 180 and passed through fuel pressure regulator 170 is guided to branched paths of one directed to low-pressure delivery pipe 160 and the other directed to high-pressure delivery pipe 130.

The fuel discharged from low-pressure fuel pump 180 of the electric motor-driven type is supplied via fuel filter 190 to fuel pressure regulator 170. Fuel pressure regulator 170 is arranged upstream of low-pressure delivery pipe 160, and is configured to return a part of the fuel discharged from low-pressure fuel pump 180 back to fuel tank 200 when the fuel pressure of the discharged fuel becomes greater than a preset fuel pressure. This ensures that the fuel pressure on the downstream side of fuel pressure regulator 170 is maintained at the preset fuel pressure or lower.

On the downstream side of fuel pressure regulator 170, branched fuel pipes 135 and 136 are provided.

The fuel discharged from low-pressure fuel pump 180 and passed through fuel pressure regulator 170 is delivered via fuel pipe 135 to low-pressure delivery pipe 160. An electromagnetic relief valve 205 is provided in a fuel path extending from fuel pressure regulator 170 to low-pressure delivery pipe 160, at a certain position of fuel pipe 135.

When the fuel pressure in fuel pipe 135 becomes greater than a prescribed pressure, electromagnetic relief valve 205 forms a path for guiding a part of the fuel to fuel return pipe 220 so as to lower the fuel pressure in low-pressure delivery pipe 160 and fuel pipe 135. In addition, electromagnetic relief valve 205 is forcibly opened in response to a control signal from ECU 300# to form a path extending from fuel pipe 135 to fuel return pipe 220.

Fuel pipe 136 is connected to the intake side of high-pressure fuel pump 155. An electromagnetic spill valve 156 is provided on the discharge side of high-pressure fuel pump 155. The discharge side of high-pressure fuel pump 155 is connected via fuel pipe 165 to high-pressure delivery pipe 130.

Further, on the downstream side of high-pressure delivery pipe 130, an electromagnetic relief valve 210 is arranged between the pipe 130 and fuel return pipe 220, as in the case of the configuration example of FIG. 2.

In the fuel supply system of FIG. 4, electromagnetic relief valve 205 corresponds to the "first pressure release means" of the present invention, and electromagnetic relief valve 210 corresponds to the "second pressure release means" of the present invention.

Figure 5:
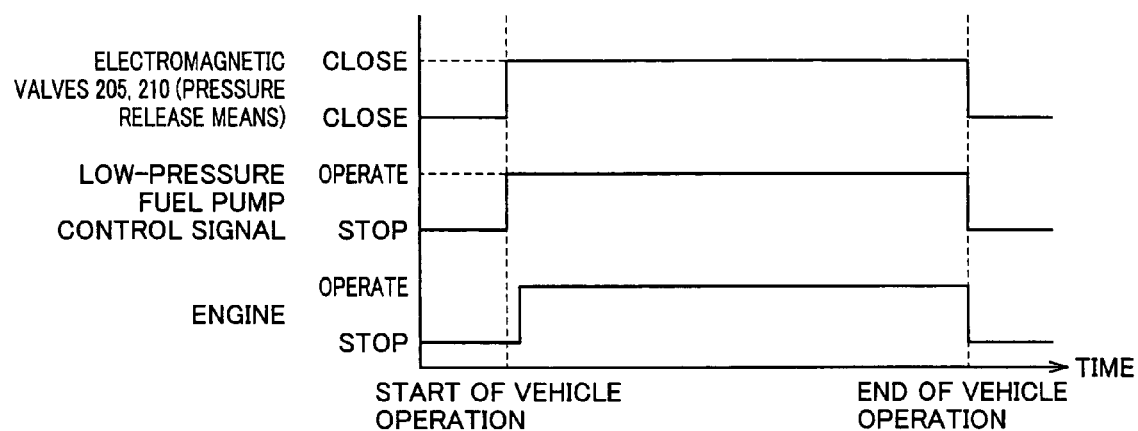
FIG. 5 is a timing diagram illustrating operation timings of a low-pressure fuel pump and pressure release means (electromagnetic relief valve) in the fuel supply system shown in FIG. 4.

FIG. 5 illustrates operations of the electromagnetic relief valves and the low-pressure fuel pump in the fuel supply system for an internal combustion engine shown in FIG. 4.

Referring to FIG. 5, the operation of low-pressure fuel pump 180 is controlled in accordance with a control signal ("LOW-PRESSURE FUEL PUMP CONTROL SIGNAL") associated with the operation period of engine 10, as in the case of FIG. 3.

Electromagnetic relief valves 205 and 210 are controlled in the same manner as electromagnetic relief valve 210 in FIG. 3, i.e., closed in response to the start of operation of the vehicle and opened in response to the end of operation of the vehicle.

Accordingly, in the fuel supply system shown in FIG. 4, the fuel pressure in high-pressure delivery pipe 130 can be lowered by opening electromagnetic relief valve 210 at the end of operation of the vehicle, and the fuel pressure in low-pressure delivery pipe 160 arranged downstream of fuel pressure regulator 170 can also be lowered sufficiently by opening electromagnetic relief valve 205. In this manner, as in the case of the fuel supply system shown in FIG. 2, leakage of the fuel from in-cylinder injectors 110 and intake manifold injectors 120 during the stop of operation of the vehicle is prevented, and thus, degradation in exhaust property at the engine start upon next start of operation can be prevented.

Although the configuration of guiding the fuel to fuel return pipe 220 at the opening of electromagnetic relief valves (pressure release means) 205, 210 has been described in the first embodiment and its modification (FIGS. 2 and 4), each valve may be configured to guide the fuel to another location in the fuel supply system as long as it can lower the fuel pressure within the corresponding delivery pipe.

Second Embodiment

Figure 6:
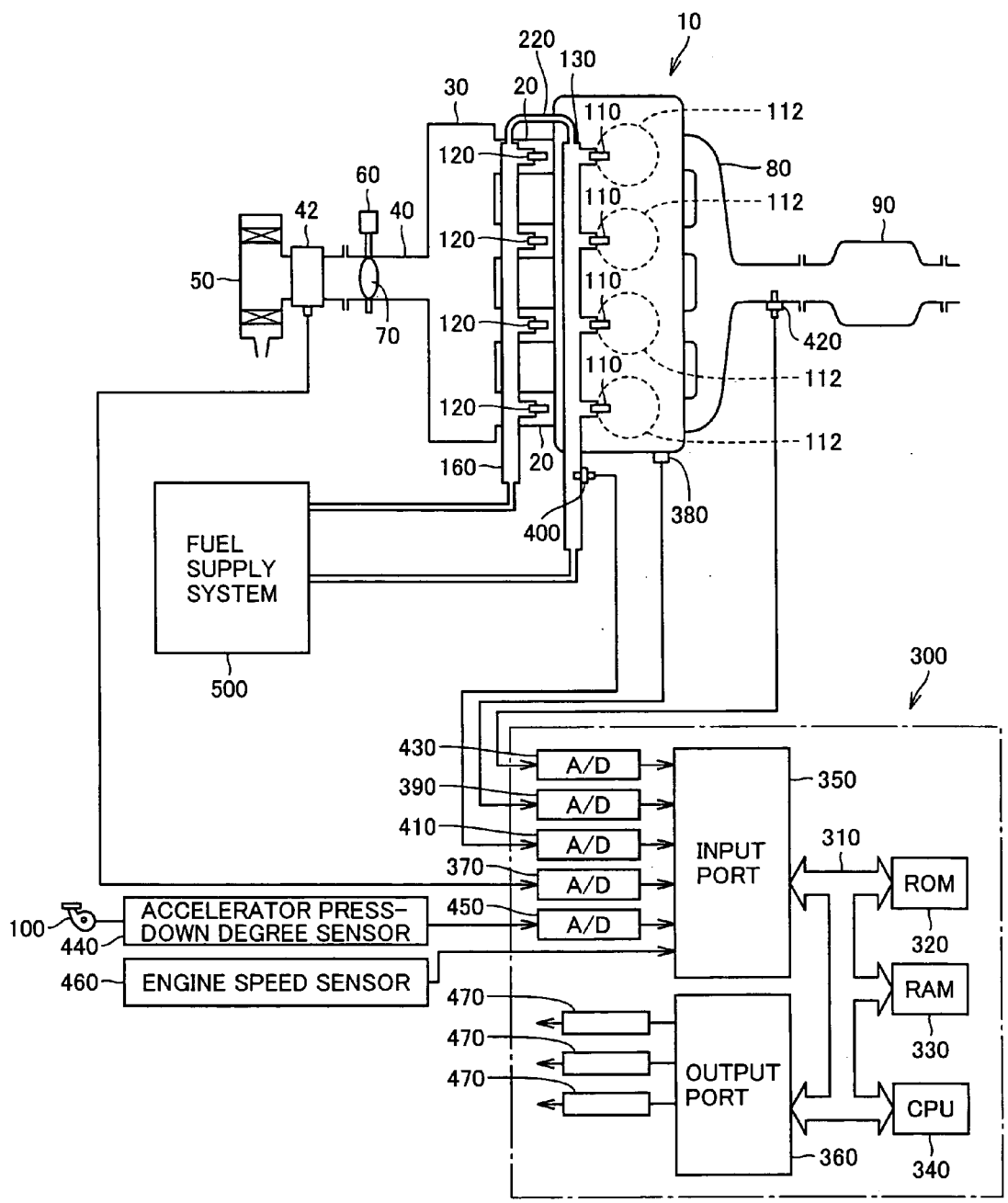
FIG. 6 is a schematic configuration diagram of an engine system incorporating a fuel supply system for an internal combustion engine according to a second embodiment of the present invention.

FIG. 6 schematically shows an engine system incorporating a fuel supply system for an internal combustion engine according to a second embodiment of the present invention.

In the engine system shown in FIG. 6, a fuel supply system 500 of the second embodiment is provided in place of fuel supply system 150 in FIG. 1. The fuel supply to fuel delivery pipes 130 and 160 is carried out by fuel supply system 500.

In the second embodiment, fuel delivery pipe 130 connected with in-cylinder injector 110 is also referred to as "DI delivery pipe", and fuel delivery pipe 160 connected with intake manifold injector 120 is also referred to as "PFI delivery pipe".

The other portions of the engine system shown in FIG. 6 are identical to those of the engine system of FIG. 1, and thus, description thereof will not be repeated.

DI delivery pipe 130 and PFI delivery pipe 160 are both subjected to heat of combustion of the fuel in the internal combustion engine. Here, DI delivery pipe 130 provided with in-cylinder injector 110 arranged in the combustion chamber receives heat of a greater amount than PFI delivery pipe 160.

Further, in engine 10, each cylinder 112 is provided with both in-cylinder injector 110 and intake manifold injector 120. Thus, it is necessary to carry out control of fuel injection ratio between in-cylinder injector 110 and intake manifold injector 120 for the overall fuel injection quantity required having been calculated according to vehicle operation states.

In principle, engine ECU 300 refers to a prepared map to set the fuel injection ratio in accordance with the engine temperature and the engine operation state (engine speed and load factor). Then, in accordance with the fuel injection ratio thus set, fuel injection is carried out using both of in-cylinder injector 110 and intake manifold injector 120 or using only in-cylinder injector 110 or intake manifold injector 120. In a cold state of the engine, for example, the fuel injection ratio is set such that fuel injection is carried out using only intake manifold injector 120 from the standpoints of exhaust property and lubrication property, as described above.

Hereinafter, a configuration of the fuel supply system for an internal combustion engine according to the second embodiment will be described in detail with reference to FIG. 7.

Figure 7:
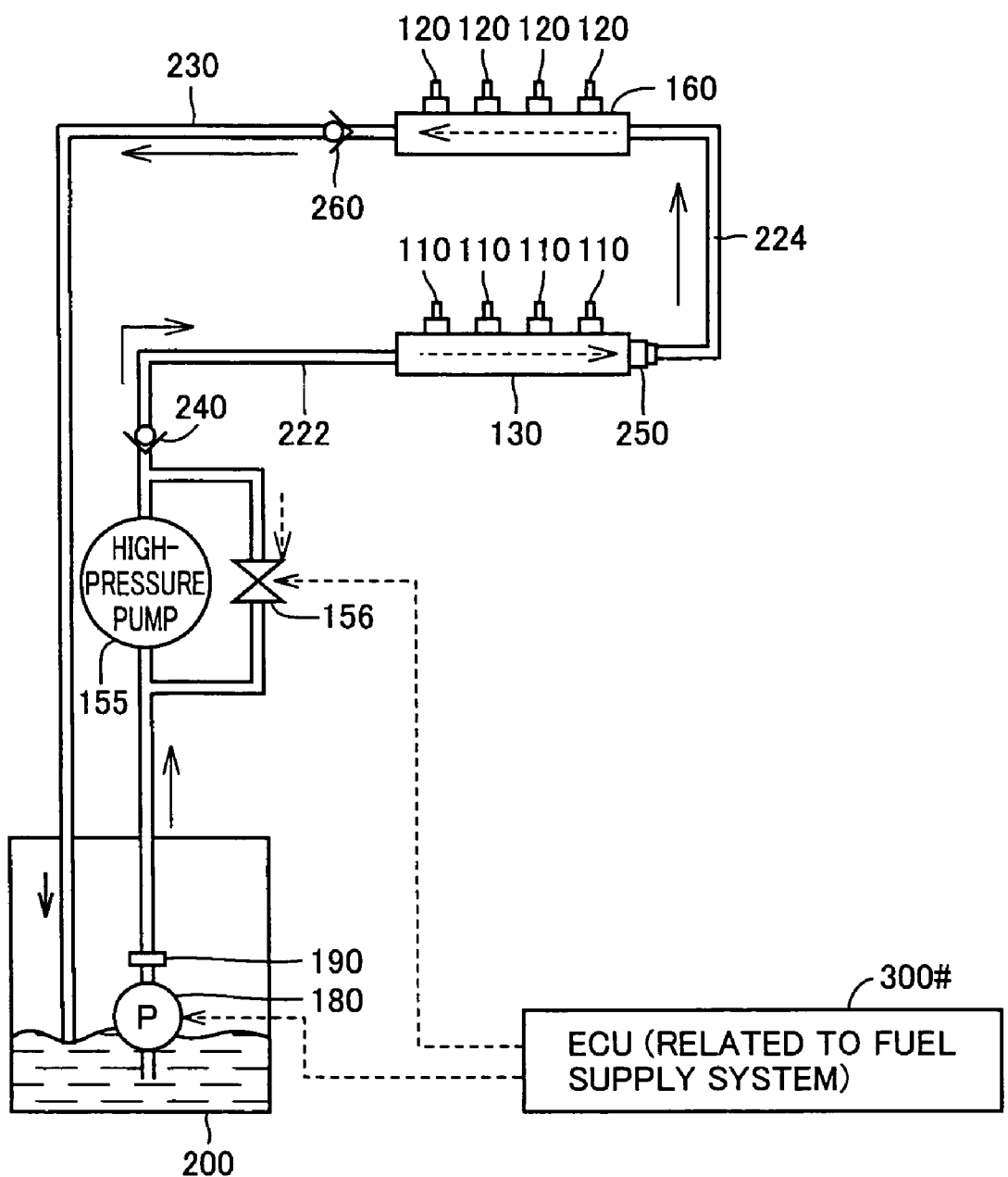
FIG. 7 is a configuration diagram of the fuel supply system for an internal combustion engine according to the second embodiment.

Referring to FIG. 7, low-pressure fuel pump (feed pump) 180, fuel filter 190, fuel tank 200, high-pressure fuel pump 155, and electromagnetic spill valve (metering valve) 156 are included in the fuel supply system 500 of FIG. 6.

Low-pressure fuel pump 180 of an electric motor-driven type discharges the fuel stored in fuel tank 200 at a prescribed pressure (low pressure). The operation period and fuel discharge quantity (flow rate) of low-pressure fuel pump 180 are controlled based on a control signal from ECU 300#. ECU 300# corresponds to a functional part of engine ECU 300 of FIG. 6 that is related to control of the fuel supply system.

The discharge side of low-pressure fuel pump 180 is connected to the intake side of high-pressure fuel pump 155 via fuel filter 190. The discharge side of high-pressure fuel pump 155 is connected to a fuel pipe 222 via a check valve 240 allowing flow directed to fuel pipe 222. Fuel pipe 222 is connected to the upstream side of DI delivery pipe 130 that is formed as a tubular body provided with an arbitrary number of in-cylinder injectors 110.

The discharge side of high-pressure fuel pump 155 is also connected to the intake side of high-pressure fuel pump 155 via an electromagnetic spill valve 156. High-pressure fuel pump 155 is of an engine driven type. With rotation of a pumping cam shaft driven by operation of engine 10, for example, a plunger performs a reciprocating motion within a cylinder, and thus, the fuel suctioned into a pressurizing chamber is compressed and increased in pressure, and is discharged at a prescribed pressure (high pressure on the order of 12 MPa, for example). The prescribed pressure (high pressure) is set to a level required for atomization of the fuel injected into the cylinder.

During the intake stroke where high-pressure fuel pump 155 suctions the fuel discharged from low-pressure fuel pump 180 into the pressurizing chamber, electromagnetic spill valve 156 is opened. During the discharge (pressurizing) stroke of high-pressure fuel pump 155, the fuel compressed by the plunger in the pressurizing chamber is delivered to fuel pipe 222 while electromagnetic spill valve 156 is closed, and while electromagnetic spill valve 156 is open, the fuel within the pressurizing chamber flows back to the intake side of high-pressure fuel pump 155, with no fuel compressing operation being conducted.

With this configuration, it is possible to control the quantity of the fuel discharged from high-pressure fuel pump 155 by control of opening/closing of electromagnetic spill valve 156 by ECU 300#. This eliminates the need for high-pressure fuel pump 155 to carry out the unnecessary fuel compressing operation exceeding the required overall fuel injection quantity, so that fuel efficiency in engine 10 serving as the driving power source of high-pressure fuel pump 155 is improved.

DI delivery pipe 130 receives the fuel discharged from high-pressure fuel pump 155 via fuel pipe 222 on the upstream side, and delivers the fuel to an arbitrary number of in-cylinder injectors 110 for injection into the internal combustion engine (in-cylinder injection). Further, a mechanical relief valve 250 is provided on the downstream side of DI delivery pipe 130. Mechanical relief valve 250 opens when a pressure equal to or greater than a set pressure (high pressure on the order of 12 MPa, for example) is applied, and guides the fuel within DI delivery pipe 130 to a connection pipe 224. As such, the fuel pressure within DI delivery pipe 130 is maintained at a prescribed level.

The fuel sent out of DI delivery pipe 130 via connection pipe 224 is supplied to the upstream side of PFI delivery pipe 160. PFI delivery pipe 160 receives the fuel from connection pipe 224 on the upstream side, and delivers the fuel to an arbitrary number of intake manifold injectors 120 for injection into the internal combustion engine (intake manifold injection).

Further, a pressure regulator 260 is provided downstream of PFI delivery pipe 160 between the pipe 160 and a pressure release path 230. Pressure regulator 260 is configured to guide the fuel on the downstream side of PFI delivery pipe 160 to pressure release path 230 when its fuel pressure becomes higher than a preset fuel pressure (low pressure on the order of 400 kPa, for example). Thus, the fuel pressure within PFI delivery pipe 160 is maintained at a prescribed pressure (low pressure) that is lower than the fuel pressure (high pressure) within DI delivery pipe 130. The fuel guided to pressure release path 230 is returned to fuel tank 200, for example.

The prescribed pressure (low pressure) may be set lower than the discharge pressure (i.e., high pressure) of high-pressure fuel pump 155, since it only needs to be a level required for atomization of the fuel injected into the intake manifold. By making the set fuel pressure in PFI delivery pipe 160 lower than that in DI delivery pipe 130, the designed withstand pressure of intake manifold injectors 120 and PFI delivery pipe 160 not requiring fuel injection at high pressure can be lowered, leading to reduction of manufacture cost.

As described above, in the fuel supply system according to the second embodiment where DI delivery pipe 130 and PFI delivery pipe 160 are connected in series, DI delivery pipe 130 for in-cylinder fuel injection receiving a relatively large amount of heat from the internal combustion engine is arranged upstream.

In this configuration, the fuel to be injected from intake manifold injectors 120 is supplied to PFI delivery pipe 160 after being passed through DI delivery pipe 130 that receives the large amount of heat. Thus, even in a cold state of the engine at the time of engine start or the like, the temperature of the fuel within PFI delivery pipe 160, that is, the temperature of the fuel injected from intake manifold injectors 120, can be increased quickly. As a result, it is possible to downsize the atomized particle size of the fuel injected from intake manifold injectors 120 in the cold state of the engine, thereby preventing degradation of exhaust property.

Meanwhile, after combustion has proceeded in the internal combustion engine following the engine start, deposits may be produced due to the temperature increase of in-cylinder injectors 110. In the fuel supply system of the present embodiment, the fuel to be injected from both of in-cylinder injector 110 and intake manifold injector 120, that is, all the fuel to be injected, is passed through DI delivery pipe 130, so that it is possible to restrict the increase in temperature of the fuel within DI delivery pipe 130. This ensures the effect of cooling in-cylinder injector 110 by the fuel passed through DI delivery pipe 130, or the fuel being injected therefrom. Accordingly, production of deposits can be prevented by restricting the increase in temperature at the tip of in-cylinder injector 110.

In the fuel supply system shown in FIG. 7, low-pressure fuel pump 180 and high-pressure fuel pump 155 each correspond to the "fuel pump" of the present invention, and PFI delivery pipe 160 and DI delivery pipe 130 correspond to the "first fuel delivery pipe" and the "second fuel delivery pipe", respectively, of the present invention. Further, mechanical relief valve 250 corresponds to the "first fuel pressure regulation means", and pressure regulator 260 corresponds to the "second fuel pressure regulation means" of the present invention.

In the fuel supply system according to the second embodiment, the fuel discharge quantity of high-pressure fuel pump 155 is relatively large, since it needs to discharge the fuel for both of in-cylinder injection and intake manifold injection. For this reason, high-pressure fuel pump 155 may have a simple configuration to compress all the suctioned fuel and discharge the resultant fuel into fuel pipe 222, without provision of the above-described electromagnetic spill valve 156 enabling adjustment of the discharge quantity.

Figure 8:
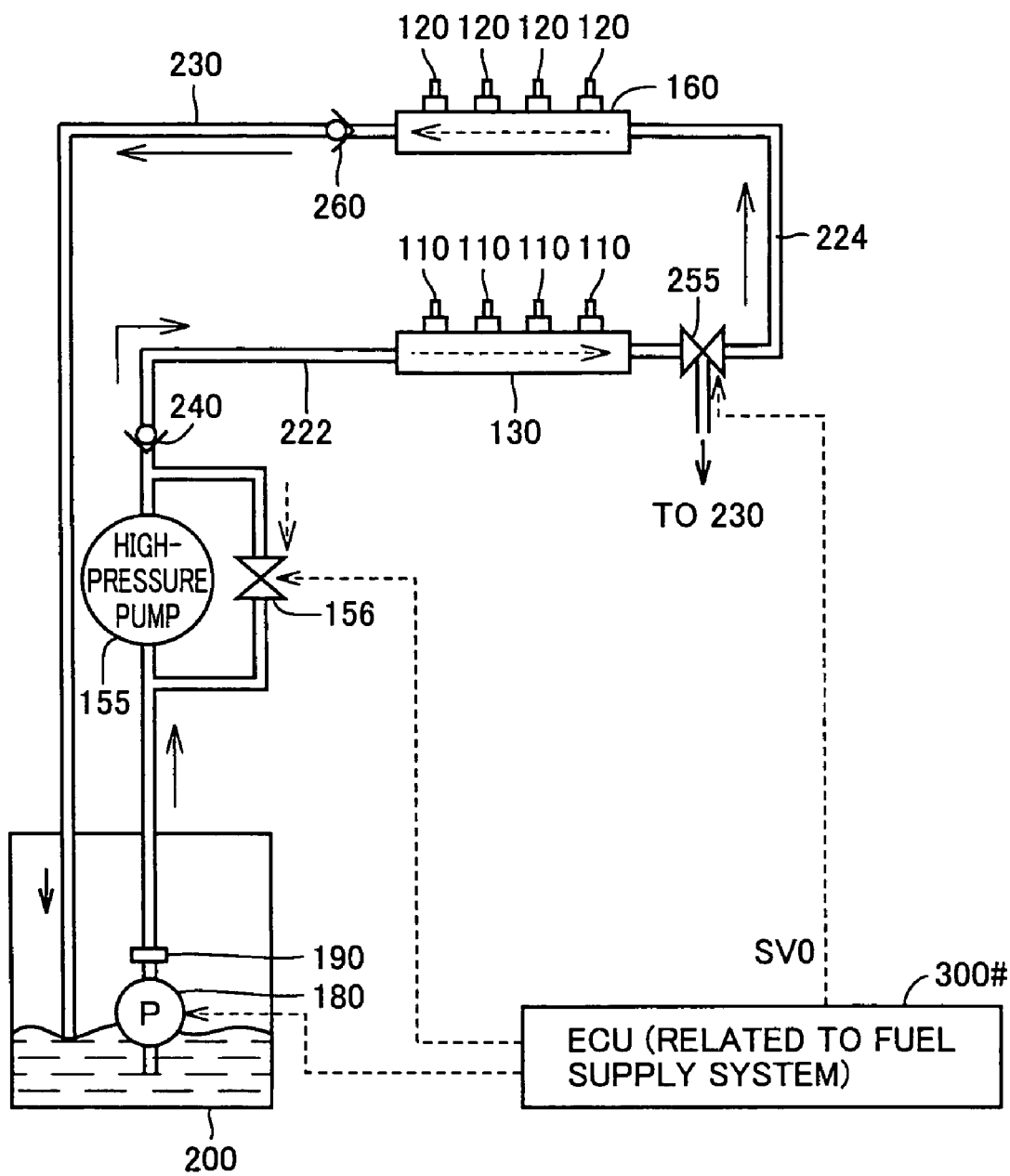
FIG. 8 is a configuration diagram showing another example of the fuel supply system for an internal combustion engine according to the second embodiment.

Alternatively, as shown in FIG. 8, a relief valve 255 equipped with an electromagnetic valve may be provided downstream of DI delivery pipe 130, instead of mechanical relief valve 250.

Referring to FIG. 8, relief valve 255 functions in the same manner as mechanical relief valve 250 shown in FIG. 7 and, in addition, opens in response to an electromagnetic valve open instruction SV0 from ECU 300# so as to connect the downstream side of DI delivery pipe 130 as well as connection pipe 224 (that is, the upstream side of PFI delivery pipe 160) to pressure release path 230.

For example, at the time of stop of vehicle operation, when ECU 300# opens relief valve 255, the fuel pressure in DI delivery pipe 130 and in PFI delivery pipe 160 can be lowered sufficiently. This improves the oil tightness of in-cylinder injectors 110 and intake manifold injectors 120 during the stop of vehicle operation, and thus, degradation in exhaust emission property at the next start of the engine due to the fuel leaking from these injectors can be suppressed.

Modification of Second Embodiment

A configuration of a fuel supply system according to a modification of the second embodiment of the present invention will now be explained with reference to FIG. 9.

Figure 9:
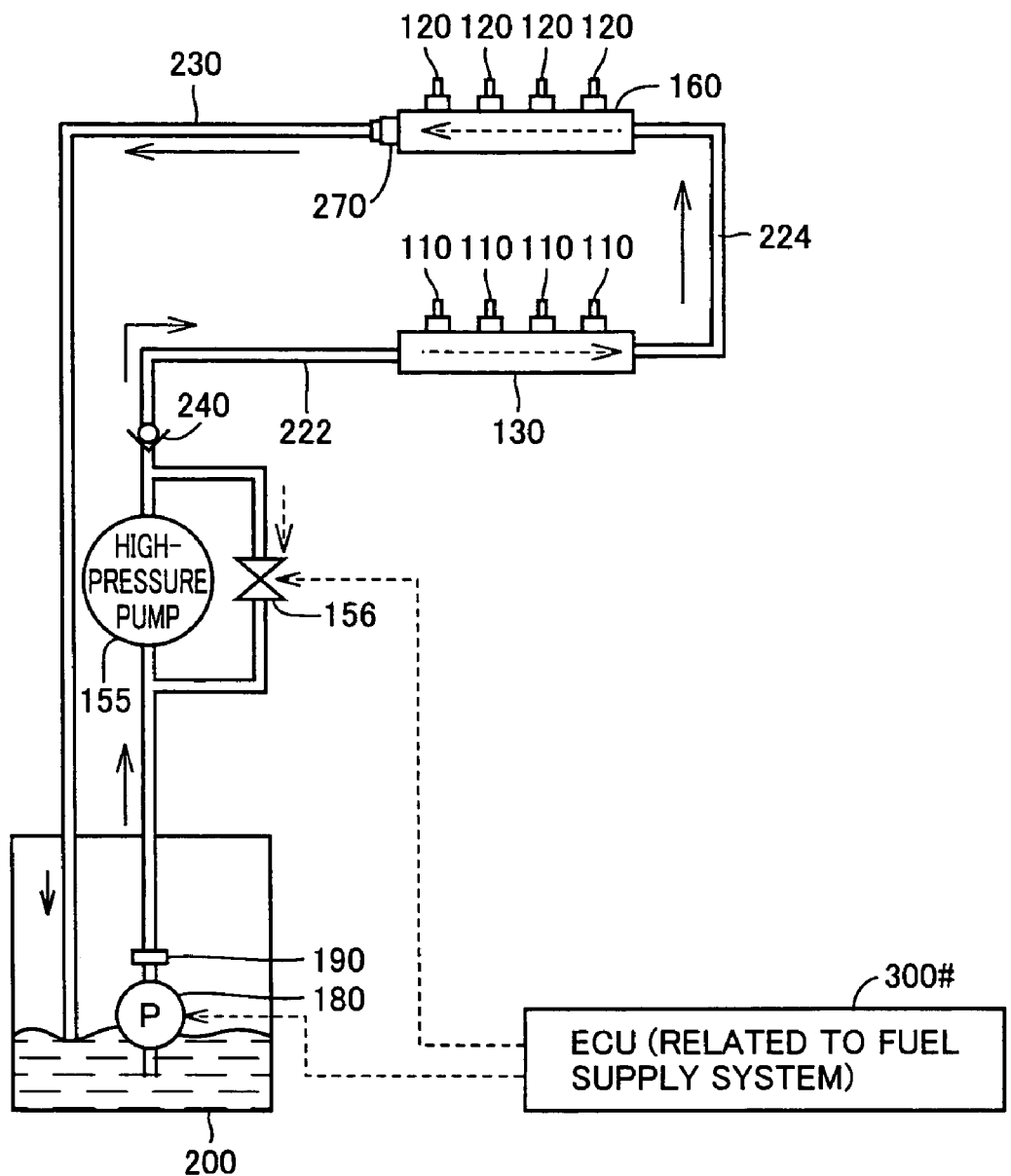
FIG. 9 is a configuration diagram of a fuel supply system for an internal combustion engine according to a modification of the second embodiment.

Referring to FIG. 9, the fuel supply system according to the modification of the second embodiment differs from the fuel supply systems shown in FIGS. 7 and 8 in that fuel pressure regulation means (mechanical relief valve 250 in FIG. 7 or relief valve 255 equipped with electromagnetic valve in FIG. 8) is not provided downstream of DI delivery pipe 130, and in that a mechanical relief valve 270 is provided between the downstream side of PFI delivery pipe 160 and pressure release path 230.

Mechanical relief valve 270 has the function similar to that of mechanical relief valve 250 shown in FIG. 7. It opens when a pressure equal to or greater than a set pressure (high pressure on the order of 12 MPa, for example) is applied, to guide the fuel within PFI delivery pipe 160 to pressure release path 230. That is, mechanical relief valve 270 corresponds to the "fuel pressure regulation means" of the present invention.

Thus, in the fuel supply system shown in FIG. 9, the fuel pressure of PFI delivery pipe 160 is set to a high pressure similarly to that of DI delivery pipe 130. Thus, not only the fuel injection from in-cylinder injectors 110, but also the fuel injection from intake manifold injectors 120 is carried out, at high pressure.

This can simplify the configuration of the system as compared with the fuel supply system of FIG. 7, since the fuel injection pressure from both injectors becomes the same. In addition, the atomized particle size of the fuel injected from intake manifold injectors 120 is further downsized, and accordingly, exhaust emission property at the time of intake manifold injection such as in the cold state of the engine can further be improved.

Figure 10:
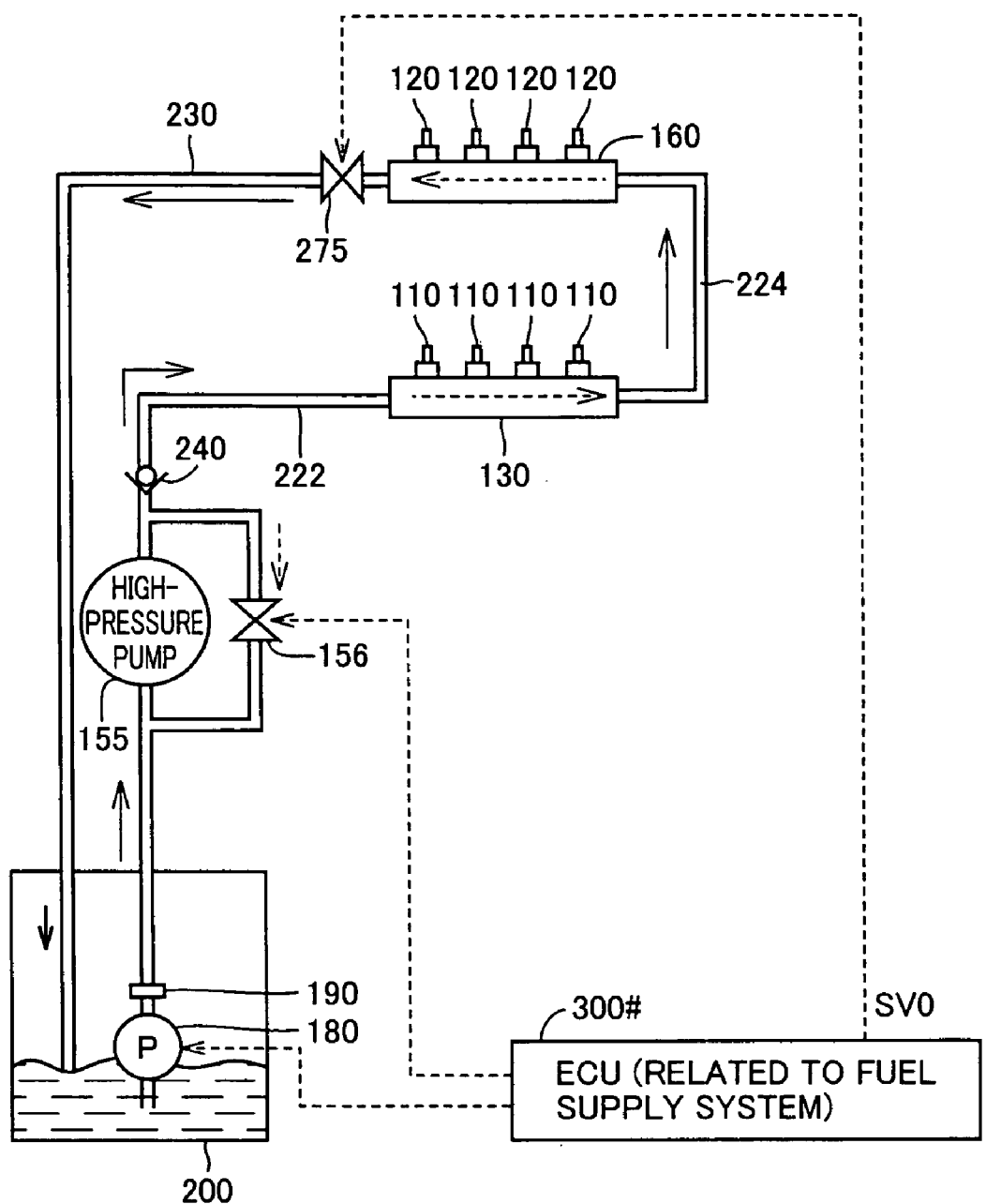
FIG. 10 is a configuration diagram showing another example of the fuel supply system for an internal combustion engine according to the modification of the second embodiment.

Alternatively, mechanical relief valve 270 provided downstream of PFI delivery pipe 160 may be replaced with a relief valve 275 that opens in response to an electromagnetic valve open instruction SV0, as shown in FIG. 10.

Referring to FIG. 10, relief valve 275 functions in the same manner as mechanical relief valve 270, and additionally serves to connect the downstream side of PFI delivery pipe 160 to pressure release path 230 in response to electromagnetic valve open instruction SV0 from ECU 300#.

When relief valve 275 is opened by the instruction from ECU 300# at the time of stop of vehicle operation as in the case of electromagnetic valve-equipped relief valve 255, the fuel pressure in DI delivery pipe 130 and in PFI delivery pipe 160 can be lowered sufficiently. This improves oil tightness of in-cylinder injectors 110 and intake manifold injectors 120 during the stop of vehicle operation and, as a result, degradation in exhaust emission property at the next engine start due to the fuel leaking from the injectors can be suppressed.

Third Embodiment

A third embodiment of the present invention will now be described with reference to FIGS. 11-14. In the third embodiment, it is assumed that the fuel supply system of the present invention is applied to an in-line 4-cylinder engine.

Figure 11:
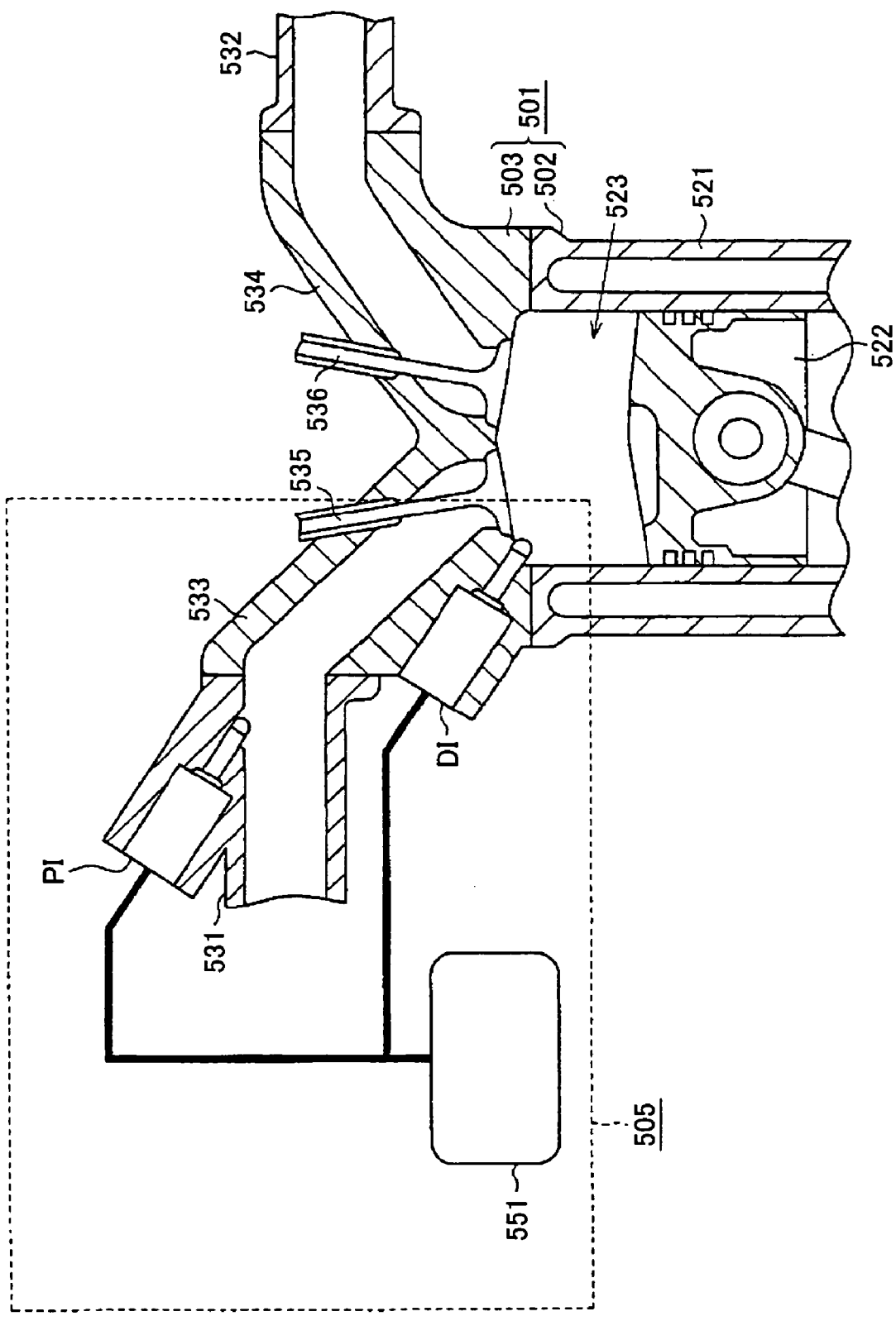
FIG. 11 is a diagram showing a cross-sectional structure of an engine to which a fuel supply system according to the present invention is applied.

FIG. 11 shows a cross-sectional structure of an engine 501 to which the fuel supply system of the present invention is applied.

Engine 501 is provided with a cylinder block 502 and a cylinder head 503. A cylinder 521 is provided in cylinder block 502. A piston 522 is contained in cylinder 521 in a reciprocable manner. A combustion chamber 523 is formed in cylinder 521, which is surrounded by the inner peripheral surface of cylinder 521, the top face of piston 522 and cylinder head 503.

An intake pipe 531 and an exhaust pipe 532 are provided at cylinder head 503. Intake pipe 531 is connected to combustion chamber 523 via an intake port 533. At intake port 533, an intake valve 535 is arranged, which opens/ closes intake port 533 to change the connection state between intake pipe 531 and combustion chamber 523.

Exhaust pipe 532 is connected to combustion chamber 523 via an exhaust port 534. At exhaust port 534, an exhaust valve 536 is arranged, which opens/closes exhaust port 534 to change the connection state between exhaust pipe 532 and combustion chamber 523.

Engine 501 is provided with a fuel supply system 505. Fuel supply system 505 includes a fuel tank 551, an arbitrary number of in-cylinder injectors DI and an arbitrary number of port injectors PI. The fuel within fuel tank 551 is supplied to in-cylinder injectors DI and port injectors PI.

In-cylinder injector DI injects the fuel into combustion chamber 523. That is, in-cylinder injector DI is provided at cylinder head 503, with its injection hole arranged inside combustion chamber 523.

Port injector PI injects the fuel into intake port 533. That is, port injector PI is provided at cylinder head 503, with its injection hole arranged inside the intake manifold.

It is noted that engine 10 shown in FIGS. 1 and 6 has a cross-sectional structure similar to that of engine 501 in FIG. 11. That is, in-cylinder injector DI and port injector PI of the third embodiment correspond to in-cylinder injector 110 and intake manifold injector 120, respectively, of the first and second embodiments.

Figure 12:
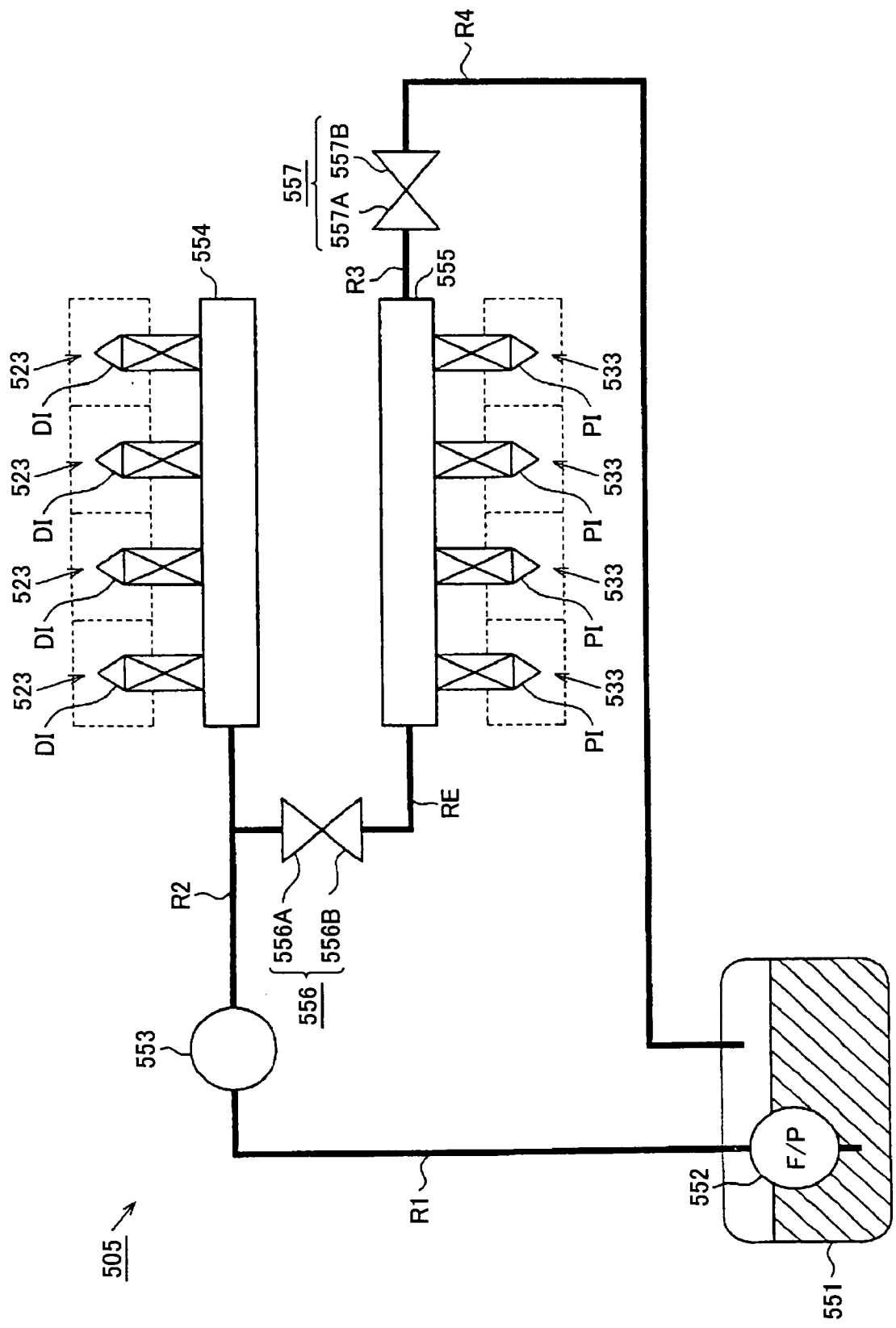
FIG. 12 is a configuration diagram of a fuel supply system for an internal combustion engine according to a third embodiment of the present invention.

FIG. 12 shows a structure of fuel supply system 505 of FIG. 11.

Firstly, the elements constituting the fuel supply system 505 will be described.

A low-pressure fuel pump 552 pumps a fuel from a fuel tank 551 and discharges the fuel to a high-pressure fuel pump 553. As low-pressure fuel pump 552, a fuel pump of an electric type discharging the fuel in a constant quantity may be used.

High-pressure fuel pump 553 applies pressure to the fuel discharged from low-pressure fuel pump 552 and discharges the resultant fuel to injectors DI, PI. As high-pressure fuel pump 553, a fuel pump of a mechanical type applying pressure to the fuel by a reciprocating motion of a plunger via a camshaft may be used. In such high-pressure fuel pump 553, the camshaft is driven via a crankshaft of engine 501.

The fuel discharge quantity of low-pressure fuel pump 552 is set such that the fuel of a sufficient quantity is supplied to high-pressure fuel pump 553 even when high-pressure fuel pump 553 is operating at the maximum rotational speed. An in-cylinder injection fuel delivery pipe 554 supplies the fuel to in-cylinder injectors DI.

In-cylinder injectors DI are provided at in-cylinder injection fuel delivery pipe 554, and each inject the fuel into combustion chamber 523 of the corresponding cylinder 521. A port injection fuel delivery pipe 555 supplies the fuel to port injectors PI.

Port injectors PI are provided at port injection fuel delivery pipe 555, and each inject the fuel into intake port 533 of the corresponding cylinder 521.

An in-cylinder injection pressure regulation valve 556 regulates the pressure of the fuel within in-cylinder injection fuel delivery pipe 554 not to exceed an in-cylinder injection pressure PA. This in-cylinder injection pressure PA corresponds to the fuel pressure that is required to ensure accurate fuel injection via in-cylinder injectors DI.

A port injection pressure regulation valve 557 regulates the pressure of the fuel within port injection fuel delivery pipe 555 not to exceed a port injection pressure PB. This port injection pressure PB corresponds to the fuel pressure that is required to ensure accurate fuel injection via port injectors PI, which is set to a level lower than in-cylinder injection pressure PA.

In the third embodiment, port injection fuel delivery pipe 555 corresponds to the "intake manifold injection fuel delivery pipe" of the present invention, and port injection pressure regulation valve 557 corresponds to the "intake manifold injection pressure regulation means" of the present invention.

Hereinafter, an operation manner of the in-cylinder injection pressure regulation valve will be described.

In-cylinder injection pressure regulation valve 556 includes an inlet port 556A and an outlet port 556B, and also includes an open/close valve that opens/closes a fuel passage (connecting the inlet port 556A and the outlet port 556B) formed therein.

The open/close valve is normally held at a position closing the fuel passage via a pressure regulation spring. When the pressure of the fuel on the inlet port 556A side (fuel within in-cylinder injection fuel delivery pipe 554) exceeds in-cylinder injection pressure PA, the open/close valve moves to open the fuel passage, to cause the fuel within in-cylinder injection fuel delivery pipe 554 to flow out to the downstream side of in-cylinder injection pressure regulation valve 556 via outlet port 556B.

As the fuel flows out, when the pressure of the fuel on the inlet port 556A side becomes equal to or lower than in-cylinder injection pressure PA, the open/close valve moves to close the fuel passage, so that the flow of the fuel from the inlet port 556A to outlet port 556B is shut off.

As the opening/closing of the fuel passage by means of the open/close valve is repeated in this manner, the pressure of the fuel in in-cylinder injection fuel delivery pipe 554 is controlled not to exceed in-cylinder injection pressure PA.

Next, an operation manner of the port injection pressure regulation valve will be described.

Port injection pressure regulation valve 557 includes an inlet port 557A and an outlet port 557B, and also includes an open/close valve that opens/closes a fuel passage (connecting the inlet port 557A and the outlet port 557B) formed therein.

The open/close valve is normally held at the position closing the fuel passage via a pressure regulation spring. When the pressure of the fuel on the inlet port 557A side (fuel within port injection fuel delivery pipe 555) exceeds port injection pressure PB, the open/close valve moves to open the fuel passage, so that the fuel within port injection fuel delivery pipe 555 flows out to the downstream side of port injection pressure regulation valve 557 via outlet port 557B.

As the fuel flows out, when the pressure of the fuel on the inlet port 557A side becomes equal to or lower than port injection pressure PB, the open/close valve moves to close the fuel passage, so that the flow of the fuel from inlet port 557A to outlet port 557B is shut off.

As the opening/closing of the fuel passage by means of the open/close valve is repeated in this manner, the pressure of the fuel within port injection fuel delivery pipe 555 is controlled not to exceed port injection pressure PB.

In fuel supply system 505, the elements are connected through the fuel pipes as follows.

The discharge side of low-pressure fuel pump 552 is connected to the intake side of high-pressure fuel pump 553 via a first fuel pipe R1. The discharge side of high-pressure fuel pump 553 is connected to the upstream side of in-cylinder injection fuel delivery pipe 554 via a second fuel pipe R2.

Inlet port 556A of in-cylinder injection pressure regulation valve 556 is connected to second fuel pipe R2. Outlet port 556B of in-cylinder injection pressure regulation valve 556 is connected to the upstream side of port injection fuel delivery pipe 555 via a connection fuel pipe RE.

The downstream side of port injection fuel delivery pipe 555 is connected to inlet port 557A of port injection pressure regulation valve 557 via a third fuel pipe R3. Outlet port 557B of port injection pressure regulation valve 557 is connected to fuel tank 551 via a fourth fuel pipe R4.

In the fuel supply system 505 of the third embodiment, first fuel pipe R1 and second fuel pipe R2 correspond to the "fuel supply pipe" of the present invention, and third fuel pipe R3 and fourth fuel pipe R4 correspond to the "fuel return pipe" of the present invention.

Figure 13:
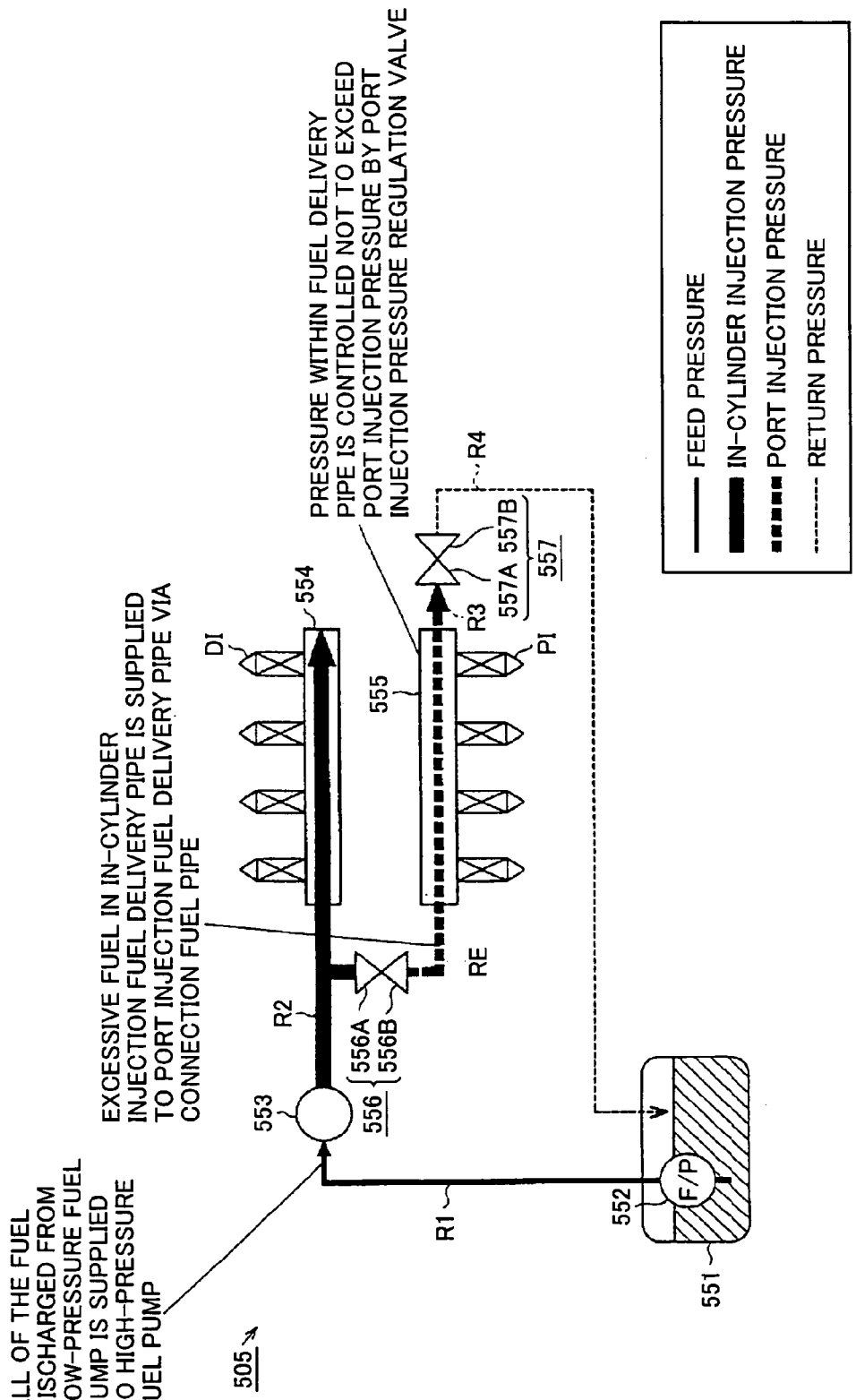
FIG. 13 illustrates the flow of the fuel in the fuel supply system shown in FIG. 12.

FIG. 13 illustrates the flow of the fuel in fuel supply system 505 during the operation of the engine.

The fuel within fuel tank 551 is discharged to first fuel pipe R1 via low-pressure fuel pump 552. The fuel pressure within first fuel pipe R1 is maintained not to exceed a discharge pressure (feed pressure PC) of low-pressure fuel pump 552.

All of the fuel discharged from low-pressure fuel pump 552 is supplied via first fuel pipe R1 to high-pressure fuel pump 553.

The fuel supplied to high-pressure fuel pump 553 is applied with pressure by high-pressure fuel pump 553 to attain a pressure greater than feed pressure PC before being discharged to second fuel pipe R2.

The fuel discharged from high-pressure fuel pump 553 is supplied via second fuel pipe R2 to in-cylinder injection fuel delivery pipe 554. The fuel pressure within in-cylinder injection fuel delivery pipe 554 (and in second fuel pipe R2) is maintained not to exceed in-cylinder injection pressure PA by in-cylinder injection pressure regulation valve 556.

The fuel flown out of outlet port 556B of in-cylinder injection pressure regulation valve 556 is supplied via connection fuel pipe RE to port injection fuel delivery pipe 555. The fuel pressure within port injection fuel delivery pipe 555 (and in connection fuel pipe RE) is maintained not to exceed port injection pressure PB by port injection pressure regulation valve 557.

The fuel flown out of outlet port 557B of port injection pressure regulation valve 557 is returned to fuel tank 551 via fourth fuel pipe R4. The fuel pressure within fourth fuel pipe R4 is maintained not to exceed a return pressure PD corresponding to the pressure within fuel tank 551.

As explained in detail above, according to the fuel supply system for an internal combustion engine of the third embodiment, the following effects are obtained.

(1) According to fuel supply system 505 of the third embodiment, all of the fuel discharged from low-pressure fuel pump 552 is supplied to high-pressure fuel pump 553. This advantageously suppresses occurrence of vapor lock attributable to insufficient fuel supply from low-pressure fuel pump 552 to high-pressure fuel pump 553.

(2) According to fuel supply system 505 of the third embodiment, the pressure of the fuel within port injection fuel delivery pipe 555 is regulated by port injection pressure regulation valve 557. This ensures accurate fuel injection from port injectors PI.

(3) According to fuel supply system 505 of the third embodiment, the fuel path is branched at the downstream side of high-pressure fuel pump 553 to the path for supplying the fuel to in-cylinder injection fuel delivery pipe 554 and the path for supplying the fuel to port injection fuel delivery pipe 555. Thus, by only supplying the fuel to high-pressure fuel pump 553 in a quantity required at the maximum rotational speed of high-pressure fuel pump 553, occurrence of vapor lock attributable to insufficient fuel supply to high-pressure fuel pump 553 can be avoided irrespective of the injection ratio between in-cylinder injectors DI and port injectors PI.

If the path for supplying the fuel to in-cylinder injection fuel delivery pipe 554 and the path for supplying the fuel to port injection fuel delivery pipe 555 were branched at the upstream side of high-pressure fuel pump 553, it would be necessary to set the discharge quantity of low-pressure fuel pump 552 taking account of the fuel injection quantity from port injectors PI in addition to the fuel required at the maximum rotational speed of high-pressure fuel pump 553. That is, in order to avoid insufficient fuel supply to high-pressure fuel pump 553, the discharge quantity of low-pressure fuel pump 552 would have to be set greater than in the case of the present embodiment.

According to fuel supply system 505 of the third embodiment, it is unnecessary to supply an excessive fuel through low-pressure fuel pump 552, and thus, the discharge capability required for low-pressure fuel pump 552 can be made small.

Modification of Third Embodiment

A modification of the third embodiment of the present invention will now be described with reference to FIG. 14.

The fuel supply system of the modification of the third embodiment has the piping structure of the fuel supply system of the third embodiment modified as follows.

Figure 14:
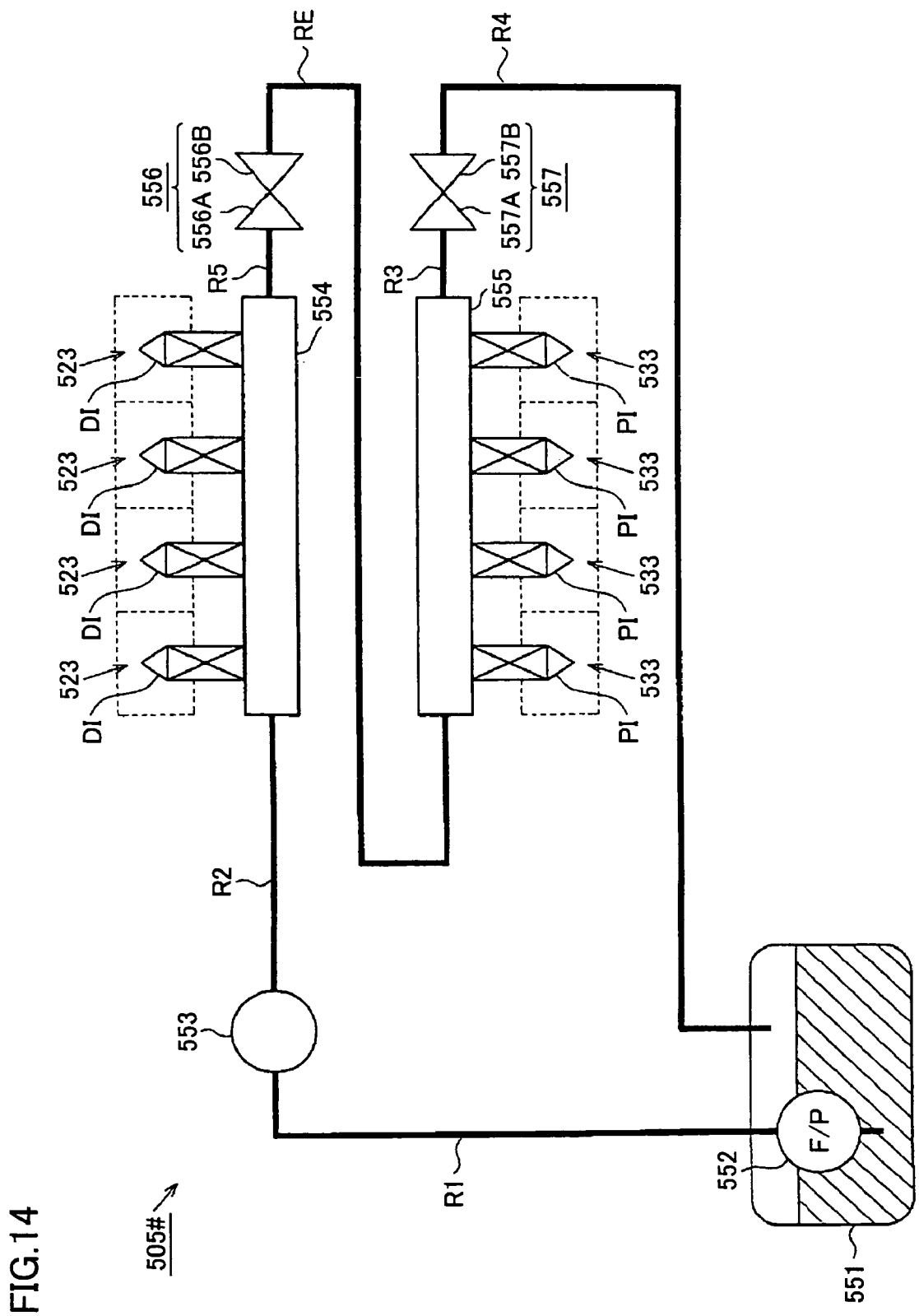
FIG. 14 is a configuration diagram of a fuel supply system for an internal combustion engine according to a modification of the third embodiment.

FIG. 14 shows a structure of the fuel supply system 505# according to the modification of the third embodiment. The fuel supply system of the modification of the third embodiment has the configuration similar to that of the fuel supply system of the third embodiment except for the following point.

In fuel supply system 505#, the downstream side of in-cylinder injection fuel delivery pipe 554 is connected to inlet port 556A of in-cylinder injection pressure regulation valve 556 via a fifth fuel pipe R5. In fuel supply system 505# of the modification of the third embodiment, first fuel pipe R1, second fuel pipe R2 and fifth fuel pipe R5 correspond to the "fuel supply pipe" of the present invention.

According to the fuel supply system for an internal combustion engine of the modification of the third embodiment, the effects similar to those of (1) to (3) described above in the third embodiment can be obtained.

The following are the elements that can be modified in the third embodiment as well as in the modification thereof.

In the third embodiment and its modification, port injector PI for injecting the fuel into intake port 533 has been provided. Port injector PI may be replaced with any other injector, as long as it can serve as an intake manifold injector for injecting the fuel into an intake manifold (including intake port, surge tank and the like).

Further, in the third embodiment and its modification, the present invention has been applied to a fuel supply system for an in-line 4-cylinder engine. The present invention however is applicable to any fuel supply system including an in-cylinder injector and an intake manifold injector, to provide the similar effects.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fuel supply system for an internal combustion engine, comprising:
   a fuel tank for storing a fuel;
   a first fuel pump actuated in response to an operation instruction associated with an operation period of said internal combustion engine and for discharging the fuel in said fuel tank at a first pressure;
   a first fuel delivery pipe formed as a tubular body having first fuel injection means and for receiving the fuel discharged from said first fuel pump at an upstream side and delivering the fuel to said first fuel injection means such that the fuel is injected into said internal combustion engine;
   a second fuel pump connected in series with said first fuel delivery pipe, actuated during operation of said internal combustion engine, and for applying pressure to the fuel received from a downstream side of said first fuel delivery pipe to discharge the fuel at a second pressure;
   a second fuel delivery pipe formed as a tubular body and connected in series with said first delivery pipe, said second pipe having a second fuel injection means and for receiving the fuel discharged from said second fuel pump at an upstream side and delivering the fuel to said second fuel injection means such that the fuel is injected into said internal combustion engine;
   a pressure regulation unit provided on a fuel path between said first fuel delivery pipe and said second fuel pump and for guiding the fuel in the fuel path to a pressure release path when a pressure of the fuel in the fuel path exceeds said first pressure; and
   pressure release means provided between the fuel path downstream of said second fuel pump and said pressure release path, actuated at the stop of operation of a vehicle, and for guiding the fuel in the fuel path to said pressure release path.

2. The fuel supply system for an internal combustion engine according to claim 1, wherein said pressure release path is a fuel return pipe to said fuel tank.

3. The fuel supply system for an internal combustion engine according to claim 1, wherein
   said first fuel injection means injects the fuel into an intake manifold of said internal combustion engine, and
   said second fuel injection means injects the fuel into a combustion chamber of said internal combustion engine.

4. A fuel supply system for an internal combustion engine, comprising:
   a fuel tank for storing a fuel;
   a first fuel pump actuated in response to an operation instruction associated with an operation period of said internal combustion engine and for discharging the fuel in said fuel tank at a first pressure;
   a first fuel delivery pipe formed as a tubular body having first fuel injection means and for receiving the fuel discharged from said first fuel pump at an upstream side and delivering the fuel to said first fuel injection means such that the fuel is injected into said internal combustion engine;
   a pressure regulation unit provided on a fuel path between said first fuel pump and an upstream side of said first fuel delivery pipe and for guiding the fuel in the fuel path to a pressure release path when a pressure of the fuel in the fuel path exceeds said first pressure;
   a second fuel pump actuated during operation of said internal combustion engine and for receiving the fuel output from said first fuel pump and further applying pressure to the fuel to discharge the fuel at a second pressure;
   a second fuel delivery pipe formed as a tubular body having a second fuel injection means and for receiving the fuel discharged from said second fuel pump and delivering the fuel to said second fuel injection means such that the fuel is injected into said internal combustion engine;
   first pressure release means provided on a fuel path between said pressure regulation unit and said first fuel delivery pipe, activated at the stop of operation of a vehicle and for guiding the fuel in the fuel path to a pressure release path; and
   second pressure release means provided on a fuel path downstream of said second fuel pump, activated at the stop of the operation of the vehicle and for guiding the fuel in the fuel path to a pressure release path.

5. The fuel supply system for an internal combustion engine according to claim 4, wherein said pressure regulation unit is integrally provided in said fuel tank.

6. The fuel supply system for an internal combustion engine according to claim 4, wherein said pressure release path is a fuel return pipe to said fuel tank.

7. The fuel supply system for an internal combustion engine according to claim 4, wherein
   said first fuel injection means injects the fuel into an intake manifold of said internal combustion engine, and
   said second fuel injection means injects the fuel into a combustion chamber of said internal combustion engine.

8. A fuel supply system for an internal combustion engine, comprising:
   a fuel tank for storing a fuel;
   a first fuel pump actuated in response to an operation instruction associated with an operation period of said internal combustion engine and for discharging the fuel in said fuel tank at a first pressure;
   a first fuel delivery pipe formed as a tubular body having a first fuel injection unit and configured to receive the fuel discharged from said first fuel pump at an upstream side and deliver the fuel to said first fuel injection unit such that the fuel is injected into said internal combustion engine;
   a second fuel pump connected in series with said first fuel delivery pipe, actuated during operation of said internal combustion engine, and configured to apply pressure to the fuel received from a downstream side of said first fuel delivery pipe to discharge the fuel at a second pressure;
   a second fuel delivery pipe formed as a tubular body and connected in series with said first delivery pipe, said second pipe having a second fuel injection unit and configured to receive the fuel discharged from said second fuel pump at an upstream side and deliver the fuel to said second fuel injection unit such that the fuel is injected into said internal combustion engine;
   a pressure regulation unit provided on a fuel path between said first fuel delivery pipe and said second fuel pump and configured to guide the fuel in the fuel path to a pressure release path when a pressure of the fuel in the fuel path exceeds said first pressure; and
   a pressure release unit provided between the fuel path downstream of said second fuel pump and said pressure release path, actuated at the stop of operation of a vehicle, and configured to guide the fuel in the fuel path to said pressure release path.

9. The fuel supply system for an internal combustion engine according to claim 8, wherein said pressure release path is a fuel return pipe to said fuel tank.

10. The fuel supply system for an internal combustion engine according to claim 8, wherein
said first fuel injection unit is configured to inject the fuel into an intake manifold of said internal combustion engine, and
said second fuel injection unit is configured to inject the fuel into a combustion chamber of said internal combustion engine.

11. A fuel supply system for an internal combustion engine, comprising:
a fuel tank for storing a fuel;
a first fuel pump actuated in response to an operation instruction associated with an operation period of said internal combustion engine and for discharging the fuel in said fuel tank at a first pressure;
a first fuel delivery pipe formed as a tubular body having a first fuel injection unit and configured to receive the fuel discharged from said first fuel pump at an upstream side and deliver the fuel to said first fuel injection unit such that the fuel is injected into said internal combustion engine;
a pressure regulation unit provided on a fuel path between said first fuel pump and an upstream side of said first fuel delivery pipe and configured to guide the fuel in the fuel path to a pressure release path when a pressure of the fuel in the fuel path exceeds said first pressure;
a second fuel pump actuated during operation of said internal combustion engine and configured to receive the fuel output from said first fuel pump and further apply pressure to the fuel to discharge the fuel at a second pressure;
a second fuel delivery pipe formed as a tubular body having a second fuel injection unit and configured to receive the fuel discharged from said second fuel pump and deliver the fuel to said second fuel injection unit such that the fuel is injected into said internal combustion engine;
a first pressure release unit provided on a fuel path between said pressure regulation unit and said first fuel delivery pipe, activated at the stop of operation of a vehicle and configured to guide the fuel in the fuel path to a pressure release path; and
a second pressure release unit provided on a fuel path downstream of said second fuel pump, activated at the stop of the operation of the vehicle and configured to guide the fuel in the fuel path to a pressure release path.

12. The fuel supply system for an internal combustion engine according to claim 11, wherein said pressure regulation unit is integrally provided in said fuel tank.

13. The fuel supply system for an internal combustion engine according to claim 11, wherein said pressure release path is a fuel return pipe to said fuel tank.

14. The fuel supply system for an internal combustion engine according to claim 11, wherein
said first fuel injection unit is configured to inject the fuel into an intake manifold of said internal combustion engine, and
said second fuel injection unit is configured to inject the fuel into a combustion chamber of said internal combustion engine.

* * * * *